(12) United States Patent
Ji et al.

(10) Patent No.: US 8,903,413 B2
(45) Date of Patent: Dec. 2, 2014

(54) HYBRID CELL MANAGEMENT IN WIRELESS NETWORKS

(75) Inventors: Tingfang Ji, San Diego, CA (US); Gavin Bernard Horn, La Jolla, CA (US); Ravi Palanki, San Diego, CA (US); Parag Arun Agashe, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 459 days.

(21) Appl. No.: 12/727,168

(22) Filed: Mar. 18, 2010

(65) Prior Publication Data

US 2010/0240373 A1    Sep. 23, 2010

Related U.S. Application Data

(60) Provisional application No. 61/161,877, filed on Mar. 20, 2009, provisional application No. 61/187,230, filed on Jun. 15, 2009, provisional application No. 61/187,599, filed on Jun. 16, 2009.

(51) Int. Cl.
H04W 72/00    (2009.01)
H04W 40/00    (2009.01)
(Continued)

(52) U.S. Cl.
CPC .............. *H04W 36/08* (2013.01); *H04W 4/06* (2013.01); *H04W 76/02* (2013.01); *Y02B 60/50* (2013.01)
USPC ........ 455/453; 455/411; 455/435.1; 455/436; 455/450; 455/422.1; 455/445; 370/329; 370/331; 709/226; 709/229

(58) Field of Classification Search
CPC ... H04W 84/045; H04W 84/12; H04W 36/20; H04W 36/22; H04W 48/20; H04W 40/04; H04W 40/06; H04W 40/08; H04W 40/10; Y02B 60/50
USPC ........... 455/422.1, 435.1, 436, 444, 446, 522, 455/437; 370/252, 328, 329, 335
See application file for complete search history.

(56) References Cited

U.S. PATENT DOCUMENTS 6,101,176 A * 8/2000 Honkasalo et al. ........... 370/335
6,301,234 B1   10/2001 Lee
(Continued)

FOREIGN PATENT DOCUMENTS

EP    0981254 A2    2/2000
EP    1156693       11/2001
(Continued)

OTHER PUBLICATIONS

Handover between Macrocell and Femtocell for UMTS based Networks Published in ICACT, 2009 dated Feb. 15-18, 2009 Authors: Mostafa Zaman Chowdhury et al.*

(Continued)

*Primary Examiner* — Dwayne Bost
*Assistant Examiner* — Nalini Mummalaneni
(74) *Attorney, Agent, or Firm* — Larry Moskowitz

(57) ABSTRACT

Systems and methodologies are described that facilitate providing hybrid cell access points that can support closed subscriber groups (CSG) while providing at least a minimum level of service to wireless devices excluded from the CSG. Hybrid cell access points can allow non-member wireless devices to camp and receive paging signals. Upon receiving a request for resources from non-member wireless devices, hybrid cell access points can handover the non-member wireless devices to an access point that can serve the non-member wireless devices, provide a portion of resources compared to a disparate portion provided to member wireless devices, and/or the like. In addition, hybrid cell access points can vary levels of service and downlink transmission power to provide load balancing for access points. Varying levels of service and downlink transmission power can facilitate additional functionality, such as reducing transmission power to serve member devices while mitigating interference to non-member devices.

41 Claims, 20 Drawing Sheets

(51) Int. Cl.
*H04W 4/00* (2009.01)
*H04W 36/08* (2009.01)
*G06F 15/16* (2006.01)
*H04W 4/06* (2009.01)
*H04W 76/02* (2009.01)

(56) References Cited

U.S. PATENT DOCUMENTS

| | | | |
|---|---|---|---|
| 6,445,924 | B1 | 9/2002 | Rasanen |
| 6,845,238 | B1 | 1/2005 | Muller |
| 6,993,359 | B1 | 1/2006 | Nelakanti et al. |
| 7,010,300 | B1 | 3/2006 | Jones et al. |
| 2004/0121781 | A1 | 6/2004 | Sammarco |
| 2004/0229621 | A1* | 11/2004 | Misra ............... 455/445 |
| 2005/0026615 | A1 | 2/2005 | Kim |
| 2005/0063336 | A1* | 3/2005 | Kim et al. ............... 370/329 |
| 2005/0152320 | A1 | 7/2005 | Marinier et al. |
| 2006/0121901 | A1 | 6/2006 | Tanaka et al. |
| 2007/0042799 | A1* | 2/2007 | Jubin et al. ............... 455/522 |
| 2007/0153687 | A1* | 7/2007 | Attar et al. ............... 370/229 |
| 2008/0188221 | A1 | 8/2008 | Hashimoto et al. |
| 2008/0220782 | A1 | 9/2008 | Wang et al. |
| 2008/0227453 | A1 | 9/2008 | Somasundaram et al. |
| 2009/0061873 | A1* | 3/2009 | Bao et al. ............... 455/436 |
| 2009/0070694 | A1* | 3/2009 | Ore et al. ............... 715/764 |
| 2011/0269468 | A1* | 11/2011 | Sundell et al. ............... 455/436 |

FOREIGN PATENT DOCUMENTS

| | | |
|---|---|---|
| EP | 1557982 | 7/2005 |
| EP | 1670273 | 6/2006 |
| EP | 1835636 | 9/2007 |
| EP | 1895714 | 3/2008 |
| JP | 2001525138 A | 12/2001 |
| JP | 2007329972 A | 12/2007 |
| WO | WO9612380 | 4/1996 |
| WO | WO9809468 | 3/1998 |
| WO | 9852375 A2 | 11/1998 |
| WO | WO0035230 | 6/2000 |
| WO | WO02096146 | 11/2002 |
| WO | WO2008115838 | 9/2008 |
| WO | 2009034076 A2 | 3/2009 |
| WO | WO2009029409 | 3/2009 |

OTHER PUBLICATIONS

3GPP TS 36.300 V8.7.0 Technical Specification Group Radio Access Network; Evolved Universal Terrestrial Radio Access (E-UTRA) and Evolved Universal Terrestrial Radio Access Network (E-UTRAN); Overall description; Stage 2 (Release 8) Published Dec. 2008.*
International Search Report and Written Opinion—PCT/US2010/028027, International Search Authority—European Patent Office—Nov. 22, 2010.

* cited by examiner

HYBRID CELL MANAGEMENT IN WIRELESS NETWORKS

CLAIM OF PRIORITY UNDER 35 U.S.C. §119

The present application for patent claims priority to Provisional Application No. 61/161,877 entitled "USING HYBRID ACCESS TO MIMIC SIGNALING ASSOCIATION" filed Mar. 20, 2009, and assigned to the assignee hereof and hereby expressly incorporated by reference herein, Provisional Application No. 61/187,230 entitled "HYBRID CELL MANAGEMENT" filed Jun. 15, 2009, and assigned to the assignee hereof and hereby expressly incorporated by reference herein, and Provisional Application No. 61/187,599 entitled "HYBRID CELL MANAGEMENT" filed Jun. 16, 2009, and assigned to the assignee hereof and hereby expressly incorporated by reference herein.

BACKGROUND

1. Field

The following description relates generally to wireless communications, and more particularly to hybrid cell access point management.

2. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), and/or multi-carrier wireless specifications such as evolution data optimized (EV-DO), one or more revisions thereof, etc.

Generally, wireless multiple-access communication systems may simultaneously support communication for multiple mobile devices. Each mobile device may communicate with one or more access points (e.g., base stations) via transmissions on forward and reverse links. The forward link (or downlink) refers to the communication link from access points to mobile devices, and the reverse link (or uplink) refers to the communication link from mobile devices to access points. Further, communications between mobile devices and access points may be established via single-input single-output (SISO) systems, multiple-input single-output (MISO) systems, multiple-input multiple-output (MIMO) systems, and so forth. In addition, mobile devices can communicate with other mobile devices (and/or access points with other access points) in peer-to-peer wireless network configurations.

Moreover, for example, different classes of access points can be provided in a wireless network, such as macro cell access points that implement high-powered communications with mobile devices. In addition, femto or pico cell access points can be provided that implement lower-powered communications with mobile devices. For example, femto or pico cell access points can communicate with the wireless network over a broadband backhaul, and thus can operate within businesses, residences, etc. to provide wireless network access on a smaller scale. Furthermore, for example, while some access points in a wireless network can provide open communications to many mobile devices, some access points can implement closed subscriber group (CSG) cells, which limit access to a portion of mobile devices within the CSG. This can be determined based on an access control list, which includes individual or group identifiers of member devices, that can be provisioned to the access point or otherwise acquired from one or more components of a wireless network, a configuration, etc.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with facilitating providing a hybrid cell that can offer closed subscriber group (CSG) access to one or more mobile devices in a subscriber group while providing a minimum level of service to mobile devices that are not in the subscriber group. In an example, the hybrid cell can allow such non-member mobile devices to camp on the hybrid cell to receive paging signals therefrom. In this example, the hybrid cell access point can handover non-member mobile devices where connection is attempted in the hybrid cell. In another example, the hybrid cell access point can prefer member mobile devices by offering increased resources, bearers, etc., while still providing a lower level of service to non-member mobile devices. Moreover, for example, a hybrid cell can configure and switch between varying levels of service to facilitate load balancing at neighboring access points.

According to related aspects, a method is provided that includes establishing a connection with a wireless device based on a received connection request and transmitting one or more paging signals to the wireless device to provide at least a minimum level of service to the wireless device. The method also includes determining the wireless device is excluded from a supported CSG.

Another aspect relates to a wireless communications apparatus. The wireless communications apparatus can include at least one processor configured to perform a random access procedure to establish a connection with a wireless device and identify the wireless device as excluded from a supported CSG. The processor is further configured to initiate a handover procedure to handover the wireless device to a disparate access point upon receiving a request for network access from the wireless device. The wireless communications apparatus also comprises a memory coupled to the at least one processor.

Yet another aspect relates to an apparatus. The apparatus includes means for establishing a connection with a wireless device based on a connection request and means for determining the wireless device is excluded from a supported CSG. The apparatus further includes means for initiating a handover procedure to handover the wireless device to a disparate access point upon receiving a request for resource allocation from the wireless device.

Still another aspect relates to a computer program product, which can have a computer-readable medium including code for causing at least one computer to perform a random access procedure to establish a connection with a wireless device and code for causing the at least one computer to identify the wireless device as excluded from a supported CSG. The computer-readable medium can also comprise code for causing the at least one computer to initiate a handover procedure to handover the wireless device to a disparate access point upon receiving a request for network access from the wireless device.

Moreover, an additional aspect relates to an apparatus including a connection establishing component that establishes a connection with a wireless device based on a connection request and a CSG member determining component that discerns the wireless device is excluded from a supported CSG. The apparatus can further include a handover component that initiates a handover procedure to handover the wireless device to a disparate access point based at least in part on a request for resource allocation from the wireless device.

According to another aspect, a method is provided that includes receiving a load balancing request related to an access point and selecting a service level related to communicating with one or more wireless devices excluded from a supported CSG based at least in part on the load balancing request. The method further includes increasing a downlink transmission power to expand a coverage area in a wireless network based at least in part on the load balancing request.

Another aspect relates to a wireless communications apparatus. The wireless communications apparatus can include at least one processor configured to obtain a load balancing request related to an access point and modify a service level related to communicating with one or more wireless devices excluded from a CSG based at least in part on the load balancing request. The processor is further configured to increase a downlink transmission power to expand a coverage area in a wireless network based at least in part on the load balancing request. The wireless communications apparatus also comprises a memory coupled to the at least one processor.

Yet another aspect relates to an apparatus. The apparatus includes means for receiving a load balancing request related to an access point and means for selecting a service level related to communicating with one or more wireless devices excluded from a supported CSG based at least in part on the load balancing request. The apparatus also includes means for increasing a downlink transmission power to expand a coverage area in a wireless network based at least in part on the load balancing request.

Still another aspect relates to a computer program product, which can have a computer-readable medium including code for causing at least one computer to obtain a load balancing request related to an access point and code for causing the at least one computer to modify a service level related to communicating with one or more wireless devices excluded from a CSG based at least in part on the load balancing request. The computer-readable medium can also comprise code for causing the at least one computer to increase a downlink transmission power to expand a coverage area in a wireless network based at least in part on the load balancing request.

Moreover, an additional aspect relates to an apparatus including a load balancing parameter receiving component that obtains a load balancing request related to an access point and a service level initializing component that selects a service level related to communicating with one or more wireless devices excluded from a supported CSG based at least in part on the load balancing request. The apparatus can further include a transmitting component that increases a downlink transmission power to expand a coverage area in a wireless network based at least in part on the load balancing request.

In yet another aspect, a method is provided that includes receiving a notification of service level adjustment by a hybrid cell access point and selecting one or more wireless devices for offloading to the hybrid cell access point. The method also includes requesting measurement reports from the one or more wireless devices to facilitate handover of the one or more wireless devices to the hybrid cell access point.

Another aspect relates to a wireless communications apparatus. The wireless communications apparatus can include at least one processor configured to obtain a notification of a service level adjustment by a hybrid cell access point and determine one or more wireless devices for offloading to the hybrid cell access point. The processor is further configured to request measurement reports from the one or more wireless devices to facilitate handover of the one or more wireless devices to the hybrid cell access point. The wireless communications apparatus also comprises a memory coupled to the at least one processor.

Yet another aspect relates to an apparatus. The apparatus includes means for receiving a notification of service level adjustment by a hybrid cell access point and means for requesting measurement reports from one or more wireless devices to facilitate handover of the one or more wireless devices to the hybrid cell access point based on the notification of service level adjustment.

Still another aspect relates to a computer program product, which can have a computer-readable medium including code for causing at least one computer to obtain a notification of a service level adjustment by a hybrid cell access point and code for causing the at least one computer to determine one or more wireless devices for offloading to the hybrid cell access point. The computer-readable medium can also comprise code for causing the at least one computer to request measurement reports from the one or more wireless devices to facilitate handover of the one or more wireless devices to the hybrid cell access point.

Moreover, an additional aspect relates to an apparatus including a load balancing requesting component that receives a notification of service level adjustment by a hybrid cell access point. The apparatus can further include a neighbor search initiating component that requests measurement reports from one or more wireless devices to facilitate handover of the one or more wireless devices to the hybrid cell access point based on the notification of service level adjustment.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed and this description is intended to include all such aspects and their equivalents.

DETAILED DESCRIPTION

Figure 1:
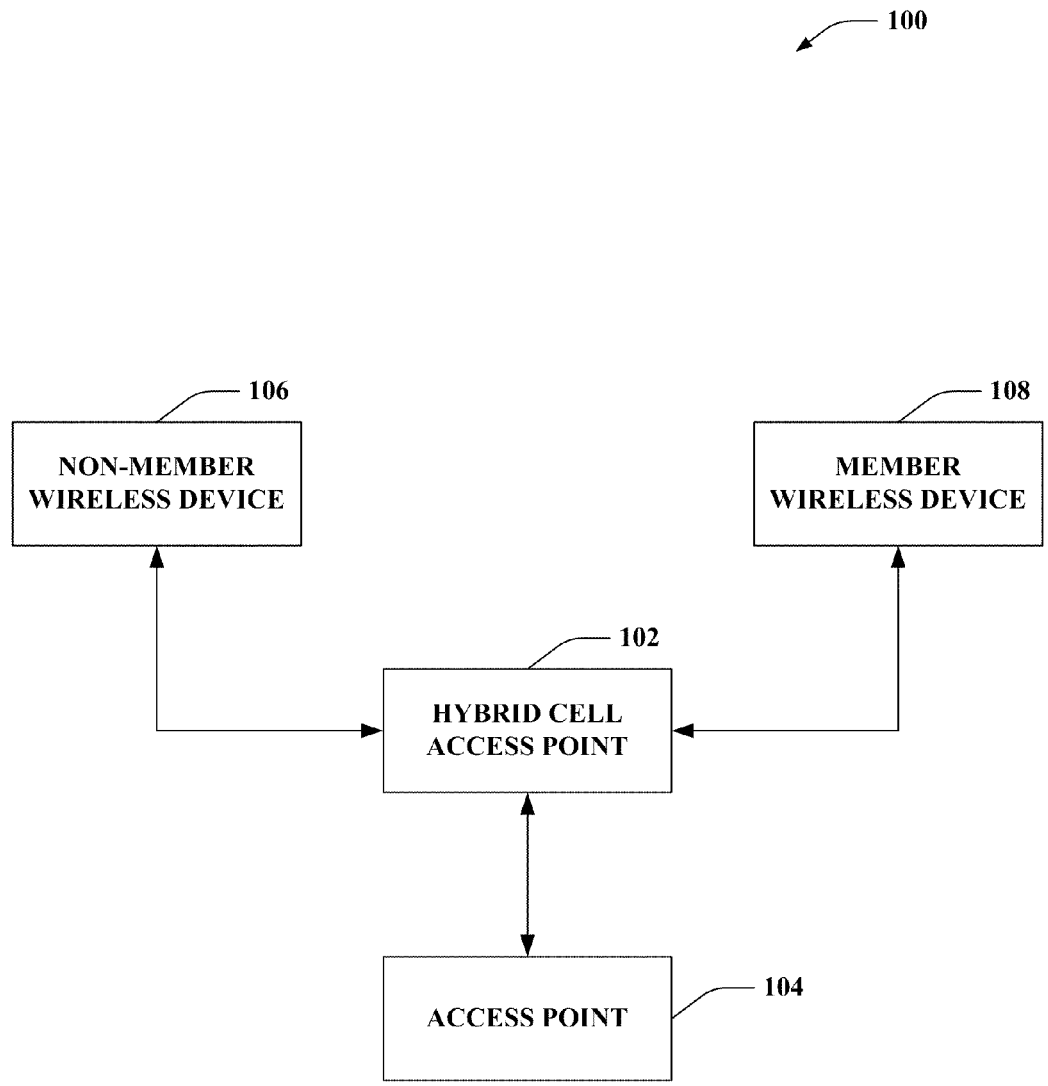
FIG. 1 is an illustration of an example wireless communications system that facilitates providing a minimum level of service to non-member devices.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, wireless device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B (e.g., evolved Node B (eNB), and/or the like), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring to FIG. 1, a wireless communication system 100 is illustrated that facilitates providing at least a minimum level of hybrid cell access to devices regardless of a membership status. System 100 includes a hybrid cell access point 102 that provides wireless network access to devices that belong to a related subscriber group as well as some access to non-member devices. System 100 also includes an access point 104 that provides wireless network access to substantially any device that conforms to a related network specification. In addition, system 100 comprises a non-member wireless device 106 that is not in a subscriber group related to the hybrid cell access point 102, and a member wireless device 108 that is a member of the subscriber group.

As described, for example, hybrid cell access point 102 can relate to a subscriber group and can offer closed subscriber group (CSG) functionality such that wireless devices in the subscriber group are offered enhanced services over non-member devices. Unlike conventional CSG cell access points, however, hybrid cell access point 102 can at least provide a minimum level of service to non-member wireless devices. Thus, hybrid cell access point 102 can advertise hybrid access to the wireless devices 106 and 108, which can be an explicit indication of hybrid access, an indication that substantially any device can access hybrid cell access point 102, and/or the like. In addition, for example, hybrid cell access point 102 can vary its level of service to non-member wireless devices to facilitate load balancing with access point 104.

According to an example, member wireless device 108 can establish a connection to hybrid cell access point 102 to camp on the hybrid cell access point 102. For example, camping can refer to establishing the connection to the hybrid cell access point 102 and receiving paging signals therefrom without actively communicating with the hybrid cell access point 102. Member wireless device 108 can subsequently request communication resources from hybrid cell access point 102 to receive access to a wireless network. Hybrid cell access point 102 can ensure member wireless device 108 is a member of a CSG associated with hybrid cell access point 102 (e.g., based on an identifier of the member wireless device 108, which can be present in an access control list, negotiated security parameters, and/or the like). Upon verifying member wireless device 108 is in the CSG, hybrid cell access point 102 can assign resources to member wireless device 108, setup appropriate bearers in the wireless network (not shown), quality of service (QoS), etc. to facilitate communicating with member wireless device 108, and/or the like. Such CSG member verification and service providing can be similar to conventional CSG functionality, in one example.

In addition, non-member wireless device 106 can establish a connection to hybrid cell access point 102 to camp on the hybrid cell access point 102 obtaining paging signals therefrom. In this regard, hybrid cell access point 102 offers a minimum level of service to substantially all wireless devices conforming to a network specification (e.g., LTE). In one example, however, when non-member wireless device 106 attempts to request resources from hybrid cell access point 102 for communicating to a wireless network, hybrid cell access point 102 can determine that non-member wireless device 106 is not a member of the CSG. In this regard, hybrid cell access point 102 can attempt to handover non-member wireless device 106 to a disparate access point, such as access point 104 or another access point that can provide resources to non-member wireless device 106. In another example, however, hybrid cell access point 102 can provide limited resources and/or bearers to non-member wireless device 106 (e.g., voice bearers only) preferring member wireless device 108 over non-member wireless device 106.

In another example, hybrid cell access point 102 can vary a level of service based on load balancing needs of access point 104. For example, hybrid cell access point 102 can move among a closed level of service for CSG devices, a paging signaling only (e.g., minimum) level of service, as described, a member-preferred level of service, as described, and a level of service where member devices and non-member devices are provided with similar resource allocations (e.g., similar to the open service provided by access point 104). In addition, hybrid cell access point 102 can increase downlink (DL) transmission power increasing its coverage area to facilitate load balancing with access point 104. Moreover, hybrid cell access point 102 can determine measures for accommodating access point 104 load balancing based at least in part on providing service to member wireless device 108 and/or additional member wireless devices.

Figure 2:
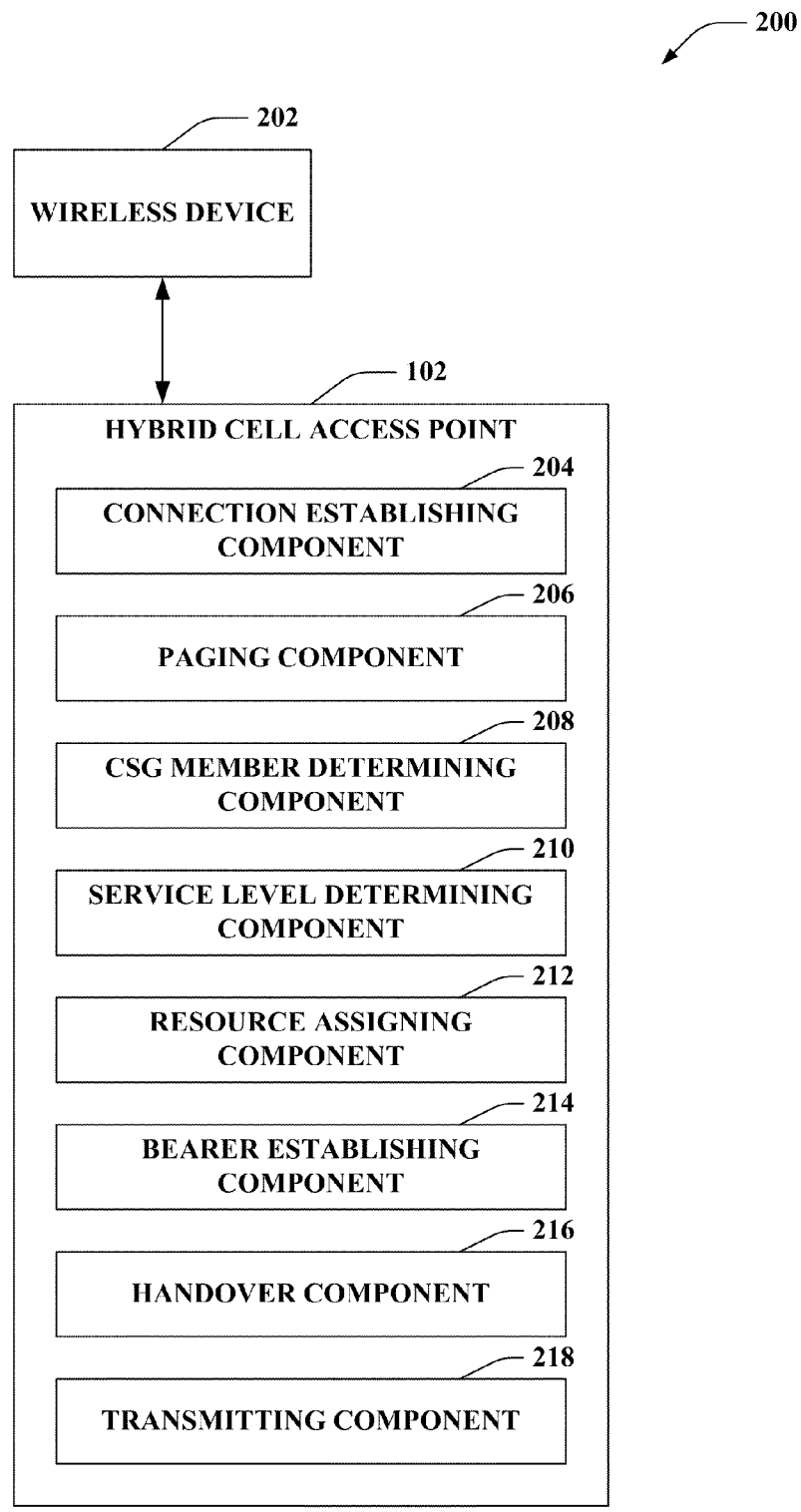
FIG. 2 is an illustration of an example wireless communications system that facilitates providing hybrid cell access to member and non-member devices.

Turning to FIG. 2, illustrated is a wireless communication system 200 that facilitates providing hybrid cell access to member and non-member devices. System 200 includes a hybrid cell access point 102, which can be substantially any device that provides one or more wireless devices with access to a wireless network (not shown) according to membership of the one or more wireless devices in a subscriber group. System 200 can additionally include a wireless device 202 that communicates with the hybrid cell access point 102 to receive a level of service for accessing a wireless network. Wireless device 202 can be a UE, mobile device, tethered device (such as a modem), mobile base station, access point, relay node, and/or substantially any device that receives access to a wireless network from an access point. Moreover, system 200 can be a MIMO system and/or can conform to one or more wireless network system specifications (e.g., EV-DO, 3GPP, 3GPP2, 3GPP LTE, WiMAX, etc.) and can comprise additional components to facilitate communication between hybrid cell access point 102 and wireless device 202.

Hybrid cell access point 102 can include a connection establishing component 204 that can setup a connection with one or more wireless devices regardless of whether the one or more wireless devices are members of a CSG supported by the hybrid cell access point 102, a paging component 206 that transmits paging signals to the one or more wireless devices camping on hybrid cell access point 102, and a CSG member determining component 208 that discerns whether the one or more wireless devices belong to the CSG. Hybrid cell access point 102 additionally includes a service level determining component 210 that selects a level of service to provide to the one or more wireless devices based on whether the one or more wireless devices belong to the CSG, a resource assigning component 212 that allocates a set of resources to the one or more wireless devices based at least in part on membership to the CSG, and a bearer establishing component 214 that activates bearers in a wireless network for the one or more wireless devices based on membership to the CSG. Hybrid cell access point 102 can also comprise a handover component 216 that initiates a handover procedure for the one or more wireless devices to a disparate access point where, for example, the one or more wireless devices do not belong to the CSG, and a transmitting component 218 that communicates with one or more wireless devices over a set of resources.

According to an example, wireless device 202 can request a connection to hybrid cell access point 102 (e.g., over a random access channel (RACH) provided by hybrid cell access point 102), and connection establishing component 204 can confirm connection establishment to wireless device 202. In this regard, for example hybrid cell access point 102 can advertise hybrid access (e.g., in a reference signal (RS) or similar broadcast message). In one example, wireless device 202 can request connection to hybrid cell access point 102 following radio link failure (RLF) to a disparate access point, where hybrid cell access point 102 has more desirable communication parameters (e.g., signal-to-noise ratio (SNR), RS received power (RSRP), RS received quality (RSRQ), etc.) than the disparate access point. In any case, paging component 206 can transmit paging signals to one or more wireless devices connected to hybrid cell access point 102; for example, the paging signals can facilitate maintaining an idle mode connection to hybrid cell access point 102. Wireless device 202 can receive the paging signals to maintain connection and can utilize information in the paging signals to request network access from hybrid cell access point 102. As described, wireless device 202 may or may not be a member of a CSG provided by hybrid cell access point 102, and thus hybrid cell access point 102 can at least communicate with wireless device 202 at a minimum level of service providing paging signals thereto (e.g., allowing wireless device 202 to camp on hybrid cell access point 102).

In an example, CSG member determining component 208 can ascertain whether wireless device 202 is a member of a CSG associated with hybrid cell access point 102. For instance, CSG member determining component 208 can determine such based at least in part on an identifier of wireless device 202, a group identifier associated with wireless device 202, and/or the like. For instance, CSG member determining component 208 can attempt to locate such identifiers in a stored access control list, which can such identifiers corresponding to devices in the CSG. The list can be received, for example, from a component of the wireless network, generated by the hybrid cell access point 102 based on a configuration, and/or the like. In one example, CSG member determining component 208 can discern CSG membership based at least in part on a request for wireless network access received from wireless device 202, which can include an identifier thereof, as described. Moreover, in an example, CSG member determining component 208 can receive an indication of whether wireless device 202 is a member of the CSG from the wireless network, or one or more components thereof. Based at least in part on whether wireless device 202 is a member of the CSG, service level determining component 210 can select a level of service for communicating with the wireless device 202.

As described, for example, where wireless device 202 is in the CSG, service level determining component 210 can provide substantially open access to wireless device 202. In this regard, upon receiving a request for wireless network access, resource assigning component 212 can allocate a set of resources to wireless device 202 for communicating with hybrid cell access point 102. Similarly, for example, bearer establishing component 214 can activate one or more bearers in a wireless network (not shown) for communicating data to/from wireless device 202. In this regard, for example, the request can include a request for a data bearer (e.g. a default bearer, dedicated bearer, and/or the like), a request to establish connection with a public data network (PDN), an indication to activate bearers as part of a registration procedure for wireless device 202, etc., and can be received from wireless device 202, from a wireless network component (e.g., in response to the wireless device 202 activating the connection), and/or the like.

Where wireless device 202 is not in the CSG, for example, service level determining component 210 can select a minimum level of service for wireless device 202 such that it allows wireless device 202 to camp and receive paging signals. In this example, when wireless device 202 requests wireless network access from hybrid cell access point 102, for example, handover component 216 can initiate a handover procedure for wireless device 202 to handover to a disparate access point that can communicate with wireless device 202 (e.g., an open access point, a disparate CSG access point where wireless device 202 is in the disparate CSG, and/or the like). It is to be appreciated that initiating a handover procedure can include handover component 216 requesting measurement reports (e.g., inter- and/or intra-frequency) from wireless device 202 to determine desirable candidate access points for handover. Where there is no disparate access point in the measurement reports (e.g., no access points have a SNR or other communication parameters at or above a threshold level), resource assigning component 212, or another component of hybrid cell access point 102, can refuse access to wireless device 202, for example, and wireless device 202 can continue to camp.

Furthermore, handover component 216 can evaluate the candidate access points for handover. For example, where a target access point has a SNR or similar communication parameter above a threshold and/or above a threshold difference from hybrid cell access point 102, handover component 216 can handover wireless device 202 to the target access point. In an example, transmitting component 218 can adjust one or more transmission parameters based at least in part on handing over wireless device 202 (e.g., based on received measurement reports) to a target access point (not shown) to provide a reliable connection on handover. For example, transmitting component 218 can adjust a transmission power to allow wireless device 202 to communicate with the target access point. In one example, transmitting component 218 can determine an SNR, RSRP, RSRQ, etc. of the target access point, and can adjust transmission power accordingly. Thus, for example, if one or more of the foregoing parameters (e.g., received in the measurement report or otherwise) is below a threshold difference from that of hybrid cell access point 102 at wireless device 202, transmitting component 218 can appropriately adjust transmission power to improve wireless device 202 communications with the target access point.

Moreover, in an example, transmitting component 218 can switch frequencies after handing over wireless device 202 to mitigate interference caused to communications between wireless device 202 and the target access point. It is to be appreciated that the foregoing transmission parameter adjustments can be additionally based on other parameters related to communications at hybrid cell access point 102 (e.g., such as effect on SNR of one or more member wireless devices communicating therewith, a number of member wireless devices that would require a change in frequency to continue communicating with hybrid cell access point 102, and/or the like). In yet another example, where an inter-frequency access point has an SNR above a threshold level, for example, handover component 216 can cause wireless device 202 to change its frequency and can handover wireless device 202 to the inter-frequency access point, rather than adjusting transmission parameters.

In another example, where wireless device 202 is not in the CSG, service level determining component 210 can provide a higher level of service to wireless device 202 (e.g., a member-preferred service level) such that non-member wireless devices can receive a smaller portion of resources and/or limited bearers as compared to member wireless devices. Thus, in this example, resource assigning component 212 can assign a smaller portion of resources based on the level of service, and/or bearer establishing component 214 can activate a bearer with a core network according to the level of service (e.g., voice bearers only for non-member wireless devices). In one example, resource assigning component 212 can assign a portion of resources blanked by a neighboring access point to facilitate load balancing with the neighboring access point, as further described below. For example, blanked resources can refer to resources over which access point 104 ceases transmission.

It is to be appreciated that where the smaller portion of resources or limited bearers are insufficient for wireless device 202, wireless device 202 can request handover to a disparate access point, and handover component 216 can initiate a handover procedure, as described. Moreover, in an example, service level determining component 210 can select a substantially open level of service for non-member wireless devices as well. The varying levels of service, for example, can increase flexibility of the hybrid cell access point 102 for providing wireless network access in one or more scenarios, as described above and further herein.

Figure 3:
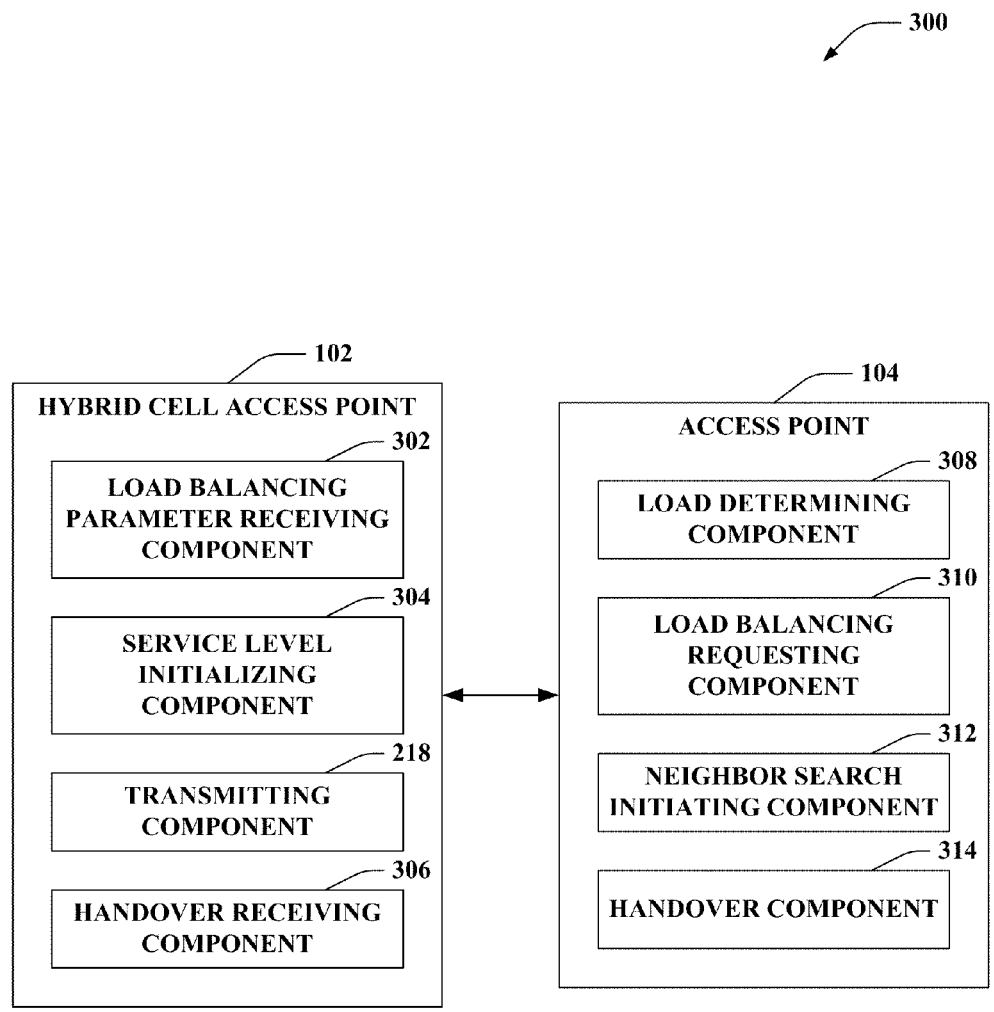
FIG. 3 is an illustration of an example wireless communications system that effectuates offloading wireless devices to a hybrid cell access point for load balancing.

Referring to FIG. 3, an example wireless communication system 300 is illustrated that facilitates load balancing between a hybrid cell access point and an access point. System 300 includes a hybrid cell access point 102, which as described, can be substantially any device that provides one or more wireless devices (not shown) with access to a wireless network (not shown) according to membership of the one or more wireless devices in a subscriber group. System 300 also includes an access point 104, which can be macro cell, femto cell, or pico cell access point, or other eNB, for example, a mobile device, or portions thereof, or substantially any device that provides one or more wireless devices with access to a wireless network. Moreover, system 300 can be a MIMO system and/or can conform to one or more wireless network system specifications (e.g., EV-DO, 3GPP, 3GPP2, 3GPP LTE, WiMAX, etc.) and can comprise additional components to facilitate communication between hybrid cell access point 102 and access point 104. In addition, for example, access point 104 can be a hybrid cell access point and can include components of hybrid cell access point 102 and/or vice versa to provide similar functionality to one or more wireless devices.

Hybrid cell access point 102 comprises a load balancing parameter receiving component 302 that obtains a request and/or one or more parameters related to assisting an access point with load balancing and a service level initializing component 304 that can modify a level of service for non-member wireless devices to facilitate assisting in load balancing. Hybrid cell access point 102 also includes a transmitting component 218 that can modify DL transmission power to expand or contract a wireless network coverage area and a handover receiving component 306 that establishes communications with one or more wireless devices as a result of a handover procedure initiated at access point 104.

Access point 104 includes a load determining component 308 that computes a load on access point 104 related to a number of resources allocated to one or more devices and a load balancing requesting component 310 that can transmit a request for load balancing to a neighboring hybrid cell access point specifying one or more parameters. Access point 104 additionally includes a neighbor search initiating component 312 that can cause one or more wireless devices to search for neighboring access points to facilitate handing over thereto and a handover component 314 that hands over the one or more wireless devices to a hybrid cell access point to effectuate load balancing.

According to an example, load determining component 308 can compute a load on access point 104. For example, load determining component 308 can determine a number of resources allocated to one or more wireless devices as compared to a number of available resources, a number of served devices compared to a number of supported devices, and/or the like. In another example, load determining component 308 can compare a number of available resources to a threshold number. In either case, where the number of available resources decreases beyond a desired level, for example, load balancing requesting component 310 can transmit a request for load balancing to hybrid cell access point 102. In one example, the request can include one or more parameters related to requesting load balancing, such as a desired number of devices to offload to hybrid cell access point 102, a service level to provide to non-member devices, a maximum DL transmission power, an indication of one or more resources blanked by access point 104, and/or the like. Load balancing parameter receiving component 302 can obtain the request for load balancing and/or the one or more parameters.

Service level initializing component 304 can determine a level of service to provide to non-member wireless devices to assist the access point 104 in load balancing. In one example, service level initializing component 304 can determine the level of service based at least in part on the one or more parameters. For example, where an explicit level of service is specified in the one or more parameters, service level initializing component 304 can set the level of service. In another example, where the one or more parameters specify a number of devices or resources to offload, service level initializing component 304 can select a level based on this parameter (e.g., a higher level of service where a number of devices or resources is above a threshold level). Additionally or alternatively, transmitting component 218 can modify a DL transmission power according to the load balancing request and/or related parameters. It is to be appreciated that transmitting component 218 can slew the DL power (e.g., adjust at a gradual rate) to ensure reliable access point 104 communications. In one example, the slew rate can be specified in the one or more parameters, configured by the hybrid cell access point 102, and/or the like.

By increasing DL transmission power, transmitting component 218 improves SNR of hybrid cell access point 102 for devices communicating with access point 104. In an example, service level initializing component 304 can provide an indication of a change in service level to access point 104, and/or transmitting component 218 can provide an indication of change in DL transmission power. Load balancing requesting component 310 can receive one or more of the indications. In this regard, neighbor search initiating component 312 can transmit a request to one or more wireless devices it is currently serving (e.g., communicating with to provide network access) to measure neighboring access points for handover.

In one example, neighbor search initiating component 312 can select certain wireless devices to which to transmit the request (e.g., wireless devices reporting one or more channel quality indicators (CQI) below a threshold, and/or the like). For example, the wireless devices can communicate CQI or similar control data to access point 104, and neighbor search initiating component 312 can evaluate CQI of the wireless devices. In one example, neighbor search initiating component 312 can determine CQI over a period of time to detect degradation or other trends in the CQI. Based on receiving a request for measurement reports, one or more of the wireless devices can provide a measurement report to access point 104, and handover component 314 can determine to handover the one or more wireless devices to hybrid cell access point 102 where parameters in the measurement report (e.g., SNR) are more desirable than that of access point 104.

Handover receiving component 306 can accordingly establish communications with the one or more wireless devices. Due to DL power increase by hybrid cell access point 102, some wireless devices can experience such an increase in SNR of hybrid cell access point 102, and thus handover component 314 can handover the wireless devices thereto. In one example, one or more blanked resources can be specified during a handover procedure initiated by handover component 314 over which hybrid cell access point 102 can communicate with a corresponding wireless device without interference from access point 104. Handover receiving component 306 can obtain an indication of the one or more blanked resources from handover component 314, for example. This can facilitate higher data rate transmitting to offloaded wireless devices.

Hybrid cell access point 102 can provide resources and/or bearers to the wireless devices handed over from access point 104 that are non-members, as shown in FIG. 2, according to the service level determined by service level initializing component 304. Thus, for example, hybrid cell access point 102 can provide a smaller number of resources and/or limited bearers to the non-member devices. In addition, as described, hybrid cell access point 102 can assign resources indicated as blanked by access point 104 (e.g., in the one or more parameters received by load balancing parameter receiving component 302) to the non-member wireless devices handed over from access point 104. Where increased offloading is desired by access point 104, for example, load balancing requesting component 310 can transmit a higher level of service to hybrid cell access point 102, and service level initializing component 304 can accordingly implement the higher level of service (e.g., a substantially open level of service where member wireless devices and non-member wireless devices are provided with similar resource allocations) to accommodate more wireless devices. In another example, as described, load balancing requesting component 310 can transmit a request to raise DL transmission power, and transmitting component 218 can accordingly raise the DL power to increase coverage area.

It is to be appreciated, in another example, that such parameter adjustment requests (and/or the initial load balancing request) can be transmitted to hybrid cell access point 102 by a disparate wireless network component, such as an operations administration maintenance (OAM) that is utilized by hybrid cell access point 102 and access point 104. In this example, the OAM can determine to request load balancing as well (e.g., based at least in part on parameters received from access point 104). Additionally, in yet an example, service level initializing component 304 and transmitting component 218 can automatically make parameter modifications, and can notify access point 104 (which can request neighbor searching among wireless devices) until the desired load (e.g., as indicated in the load balancing request) is achieved. In this example, transmitting component 218 can adjust DL transmission power to a level up to a threshold, and where still more offloading is needed, service level initializing component 304 can further open its service level to provide required service to more devices (e.g., move from voice only or other member-preferred service levels to a substantially open service level).

In addition, as described, transmitting component 218 can modify the DL transmission power according to one or more aspects regarding other wireless devices communicating with hybrid cell access point 102. Thus, for example, where hybrid cell access point 102 is communicating with a member wireless device, transmitting component 218 can increase or decrease DL transmission power while ensuring that the member wireless devices maintains a threshold SNR with respect to communicating with hybrid cell access point 102. In an example, the threshold SNR can relate to a maximum rate that can be supported by hybrid cell access point 102 over a backhaul link to the wireless network, decoding capabilities of the member wireless device or hybrid cell access point 102, and/or the like, as described further herein.

Similarly, once a desired load balance is achieved (e.g., as discerned by load determining component 308 based on similar parameters as describe above), load balancing requesting component 310 can transmit a notification to cease adjustments to hybrid cell access point 102. Load balancing parameter receiving component 302 can obtain the notification, and service level initializing component 304 and transmitting component 218 can accordingly hold service levels for non-member wireless devices and DL transmission power. In addition, if load determining component 308 ascertains that load is decreasing at access point 104, load balancing requesting component 310 can transmit a related notification to hybrid cell access point 102 to facilitate offloading non-member wireless devices from hybrid cell access point 102 back over to access point 104. Load balancing parameter receiving component 302 can obtain the notification, and service level initializing component 304 can adjust service levels for non-member wireless devices to be more exclusive to member wireless devices and/or transmitting component 218 can lower DL transmission power.

In addition, as described in FIG. 2, this can cause some non-member wireless devices to be handed over (e.g., where the non-member wireless devices can no longer receive resources or bearers, etc.), and the non-member wireless devices can be handed over to access point 104 or one or more additional access points. Moreover, for example, where hybrid cell access point 102 is communicating with a member wireless device, for example, transmitting component 218 can lower DL transmission power while ensuring at least a specified SNR to the member wireless device. For example, the SNR can be specified based at least in part on a maximum supported data rate over a backhaul link between hybrid cell access point 102 and a wireless network. In another example, where decoding capabilities limit the member wireless device or hybrid cell access point 102 to processing received data at a rate below that at which data is received, transmitting component 218 can further lower DL transmission power. In this regard, transmitting component 218 can modify the DL transmission power to facilitate a maximum receive rate at the member wireless device while mitigating interference caused by utilizing full DL transmission power, as described further herein.

Figure 4:
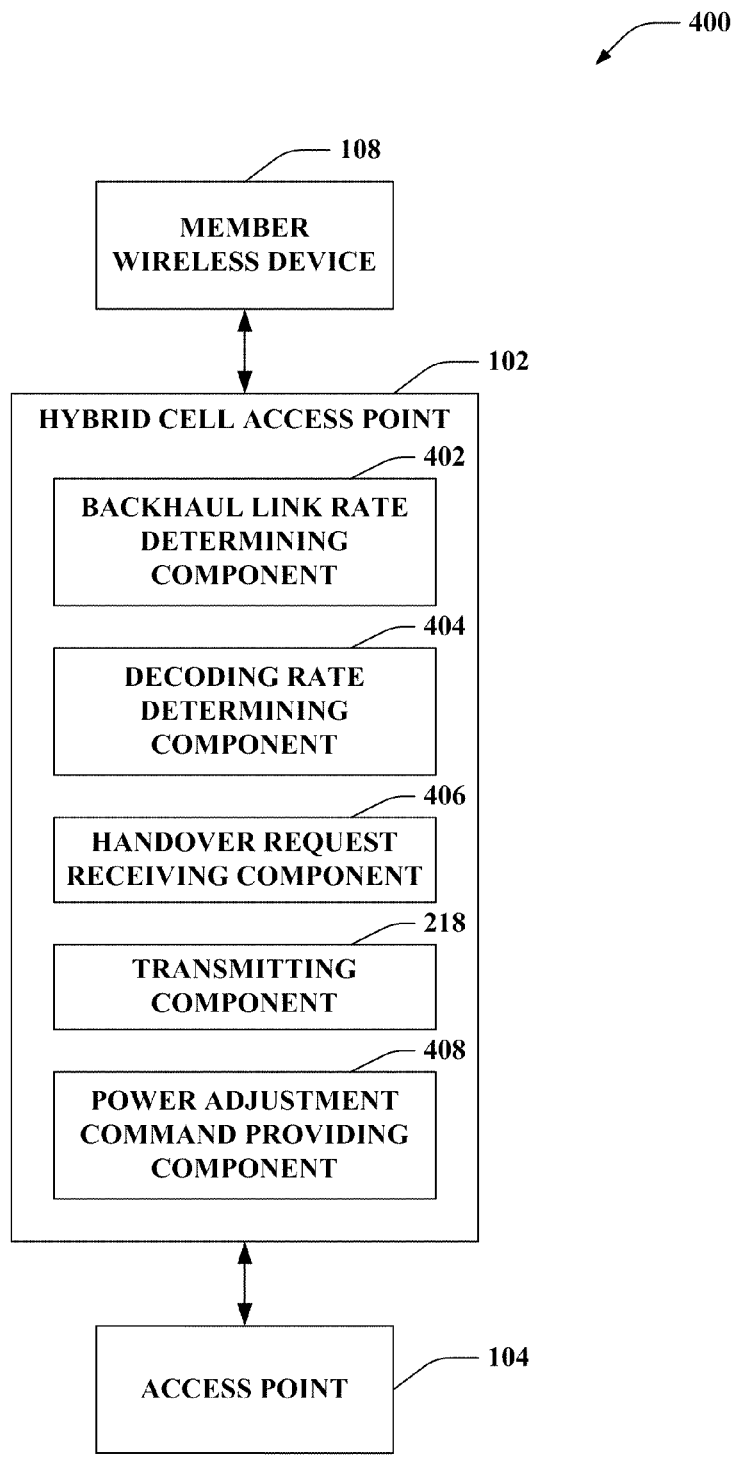
FIG. 4 is an illustration of an example wireless communications system that adjusts downlink transmission power of a hybrid cell access point.

Turning now to FIG. 4, an example wireless communication system 400 that facilitates adjusting transmit power of a hybrid cell access point is illustrated. System 400 includes a hybrid cell access point 102, which as described, can be substantially any device that provides one or more wireless devices with access to a wireless network (not shown) according to membership of the one or more wireless devices in a subscriber group. System 400 also includes an access point 104, which can be macro cell, femto cell, or pico cell access point, or other eNB, for example, a mobile device, or portions thereof, or substantially any device that provides one or more wireless devices with access to a wireless network. System 400 also includes a member wireless device 108, as described. Moreover, system 400 can be a MIMO system and/or can conform to one or more wireless network system specifications (e.g., EV-DO, 3GPP, 3GPP2, 3GPP LTE, WiMAX, etc.) and can comprise additional components to facilitate communication between hybrid cell access point 102 and access point 104. In addition, for example, access point 104 can be a hybrid cell access point and can include components of hybrid cell access point 102 and/or vice versa to provide similar functionality to other wireless devices.

Hybrid cell access point 102 can include a backhaul link rate determining component 402 that obtains a transmission rate of a backhaul link with a wireless network, a decoding rate determining component 404 that can compute a rate of decoding data received over the backhaul link, and a handover request receiving component 406 that obtains a request to receive a non-member wireless device as part of a handover procedure from an access point. Hybrid cell access point 102 additionally includes a transmitting component 218 that modifies a DL transmission power of hybrid cell access point 102 based at least in part on a backhaul link rate, decoding rate, handover request, and/or the like, and a power adjustment command providing component 408 that transmits a power adjustment command to a wireless device to facilitate uplink power adjustment.

According to an example, transmitting component 218 can modify DL transmission power of hybrid cell access point 102 in a variety of scenarios, as described above. In addition, however, transmitting component 218 can determine additional factors with adjusting the power so as not to jeopardize current communications with one or more member wireless devices. As described, for example, transmitting component 218 can increase a DL transmission power to expand coverage in a load balancing procedure. Following the load balancing procedure (e.g., when the requesting access point load decreases), transmitting component 218 can lower the DL transmission power. In another example, transmitting component 218 can lower a DL transmission power following handover of a non-member wireless device to an access point to mitigate interfering with communications between the non-member wireless device and the access point.

In an example, to facilitate lowering the DL transmission power while maintaining a level of service to member wireless device 108, backhaul link rate determining component 402 can compute or otherwise receive a data rate over a backhaul link. For example, hybrid cell access point 102 can be a femto cell access point limited by a broadband connection to a wireless network (not shown). Backhaul link rate determining component 402, in this example, determines the rate of the broadband connection. Transmitting component 218 can lower the DL transmission power to a level that maintains a data rate with member wireless device 108 that is at least as good as the backhaul link data rate, for example.

In another example, decoding rate determining component 404 can compute a rate of decoding packets received over the backhaul link. Where the decoding rate is less than the backhaul link rate, transmitting component 218 can further lower DL transmission power while maintaining a data rate with the member wireless device 108 that is at least as good as the decoding rate. In this regard, transmitting component 218 maintains a maximum data rate with member wireless device 108 while lowering DL transmission power to mitigate interference to access point 104 (and/or one or more disparate access points). In a similar example, power adjustment command providing component 408 can similarly transmit a power adjustment command to member wireless device 108 based at least in part on the backhaul link and/or decoding rate to set an uplink (UL) transmission power of member wireless device 108 to a level that allows transmitting to hybrid cell access point 102 at least at the data rate of backhaul link or the decoding rate. Thus, UL power control is facilitated as well to additionally mitigate interference to access point 104 (and/or other access points) while allowing UL communications at a maximum processing rate.

In yet another example, access point 104 can initiate a handover procedure to handover a non-member wireless device (not shown) to hybrid cell access point 102 based on more desirable communications parameters at hybrid cell access point 102, as described. Handover request receiving component 406 can obtain a request to initiate the handover procedure (a handover preparation command, and/or the like). In an example, transmitting component 218 can lower DL transmission power based on receiving the request to initiate the handover procedure to effectively decline the handover procedure. For example, lowering the DL transmission power can decrease desirability of the communications parameters at hybrid cell access point 102. In one example, handover request receiving component 406 can obtain the communication parameters (e.g., SNR, RSRP, RSRQ, etc.) from access point 104 measured by the non-member wireless device. In one example, the communication parameters can be specified in the handover request or requested based on receiving the handover request. In any case, transmitting component 218 can adjust the DL transmission power based at least in part on the communication parameters. For example, transmitting component 218 can lower the DL transmission power such that access point 104 has more desirable parameters. Moreover, for example, the DL transmission power can be lowered while maintaining a maximum effective data rate with the member wireless device 108, as described above.

Referring to FIGS. 5-10, methodologies relating to providing hybrid cell functionality are illustrated. While, for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 5:
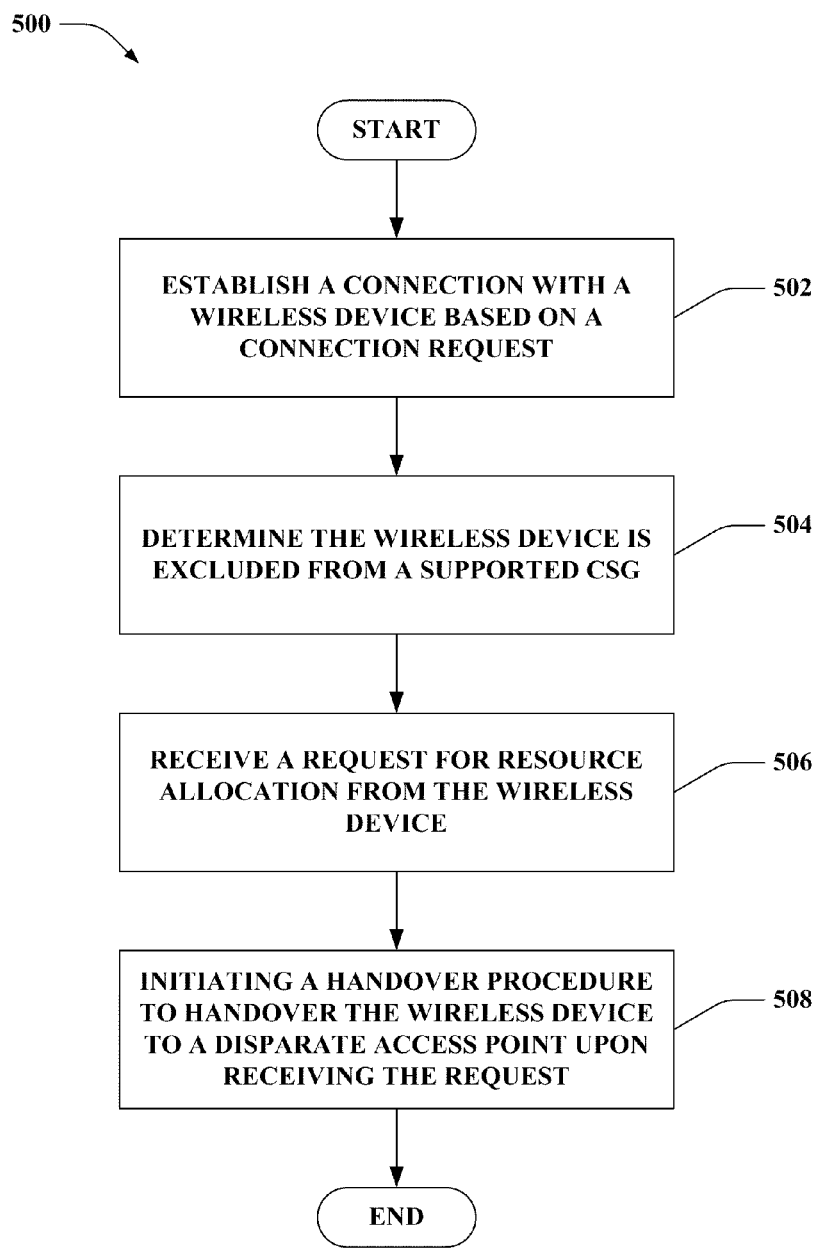
FIG. 5 is an illustration of an example methodology that facilitates providing at least a minimum level of service to non-member devices.

Turning to FIG. 5, an example methodology 500 is illustrated that facilitates providing a minimum level of service to one or more wireless devices regardless of CSG membership. At 502, a connection can be established with a wireless device based on a connection request. For example, the connection request can be received from the wireless device. At 504, it can be determined that the wireless device is excluded from a supported CSG. This can be based at least in part on detecting absence of an identifier related to the wireless device in a stored access control list, as described. At 506, a request for resource allocation can be received from the wireless device. As described, though the wireless device is excluded from the supported CSG, at least a minimum level of service can be provided to the wireless device (such as the ability to camp and receive paging signals). In addition, for example, the request can include a request for a data bearer (e.g. a default bearer, dedicated bearer, and/or the like), a request to establish connection with a PDN, an indication to activate bearers as part of a registration procedure for wireless device 202, and/or the like, as described. At 508, a handover procedure can be initiated to handover the wireless device to a disparate access point upon receiving the request for resource allocation.

Figure 6:
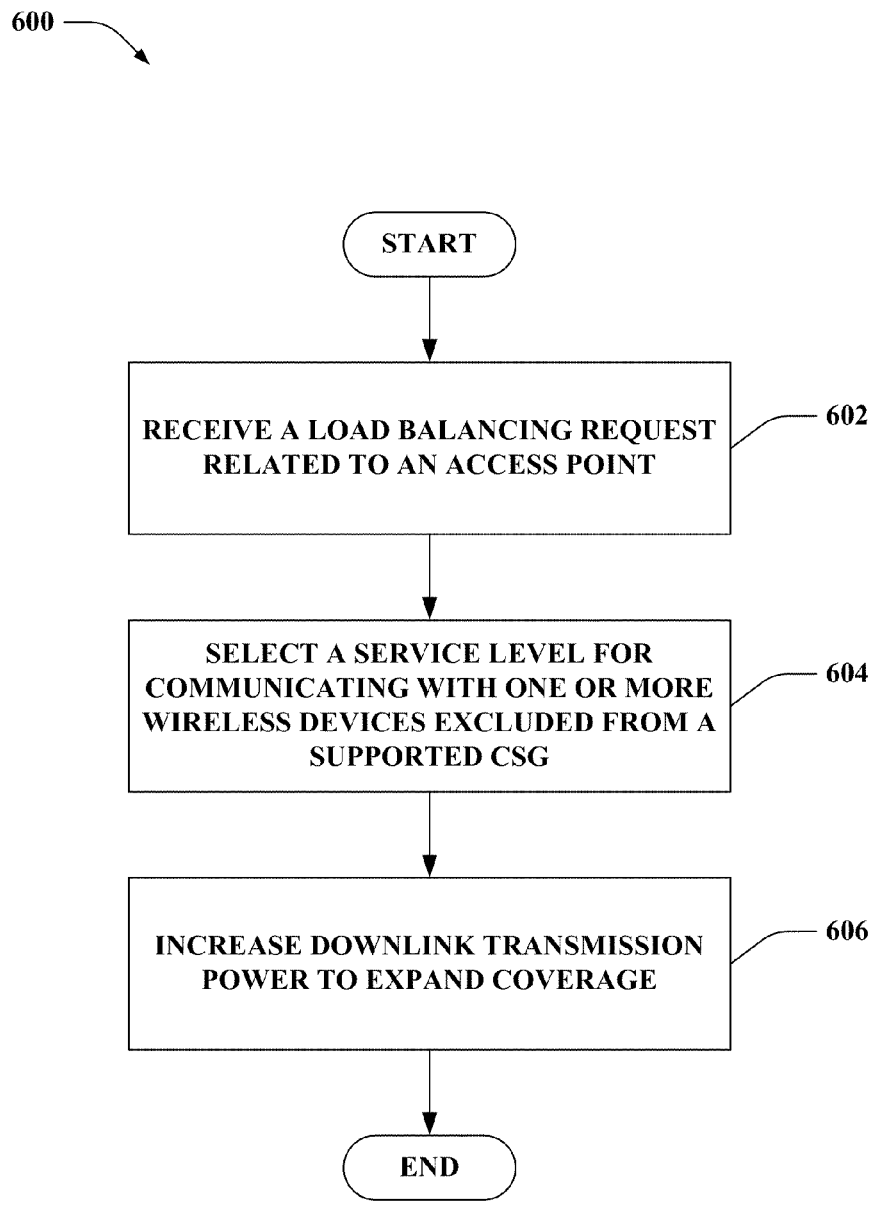
FIG. 6 is an illustration of an example methodology that facilitates modifying communications parameters to receive offloaded devices for load balancing.

Referring to FIG. 6, an example methodology 600 that facilitates assisting an access point with load balancing is illustrated. At 602, a load balancing request related to an access point can be received. As described, this can be received from the access point, from an OAM or other network component, and/or the like. At 604, a service level can be selected for communicating with one or more wireless devices excluded from a supported CSG. This can be based on the load balancing request, for example, and the selected service level can correspond to a closed, minimum, member-preferred, substantially open, or similar service level, as described above. At 606, downlink transmission power can be increased to expand wireless network coverage. In this regard, one or more devices can be handed over from the access point. The increased downlink transmission can facilitate handover, as described, as it increases communication parameters, such as SNR, RSRP, RSRQ, etc., in a measurement report. In addition, the selected service level can provide some service to the one or more wireless devices excluded from the CSG (e.g., in a member-preferred or substantially open service level) allowing the one or more wireless devices to access a wireless network.

Figure 7:
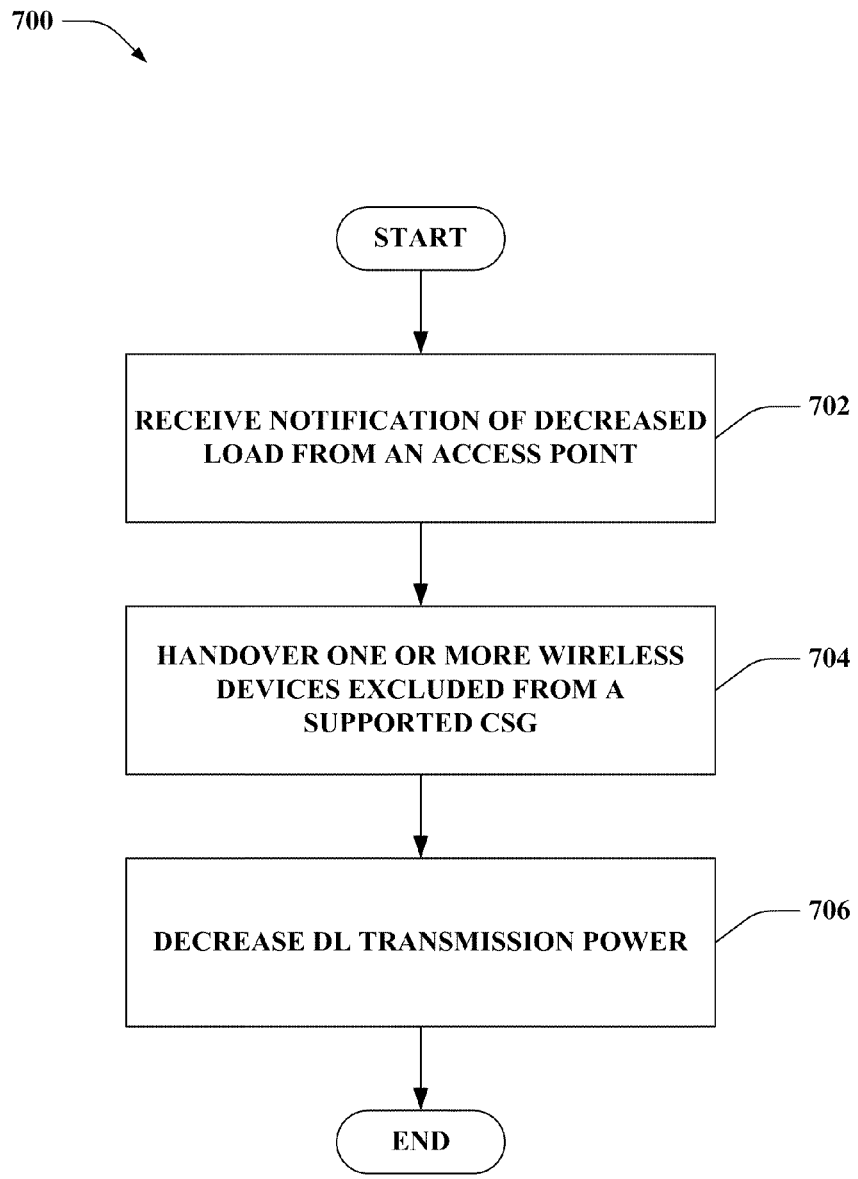
FIG. 7 is an illustration of an example methodology that modifies communications parameters following load balancing.

Turning to FIG. 7, an example methodology 700 is shown that resumes operation following load balancing with an access point. At 702, a notification of a decreased load can be received from an access point. As described, load balancing can be provided to the access point upon request, and the access point can indicate when load balancing is no longer needed and/or that a decreased level of load balancing is needed. At 704, one or more wireless devices excluded from a supported CSG can be handed over. The one or more wireless devices can have been previously provided some level of network access to facilitate the load balancing. At 706, DL transmission power can be decreased. As described, the DL transmission power can have been previously increased to attract the one or more wireless devices for load balancing; in this regard, the DL transmission power is decreased so as not to appear desirable to the one or more wireless devices when generating subsequent measurement reports.

Figure 8:
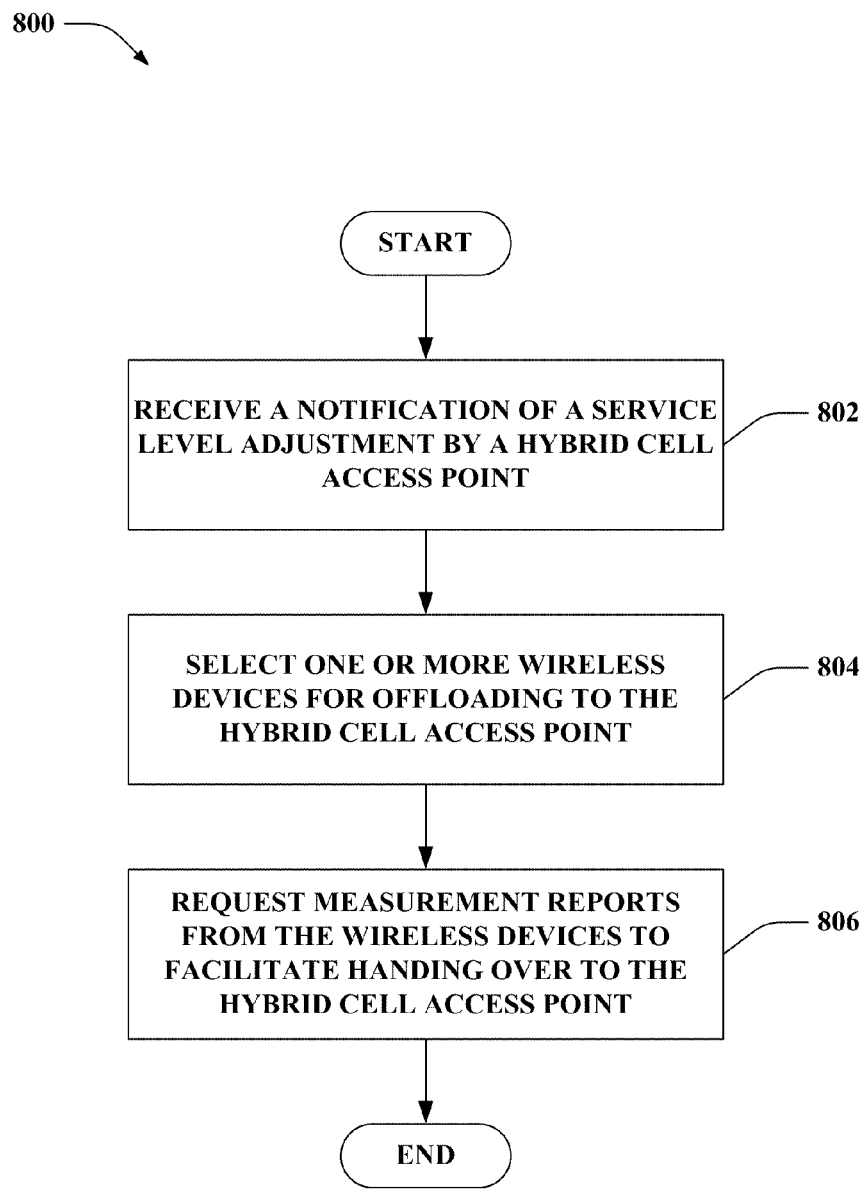
FIG. 8 is an illustration of an example methodology that facilitates offloading one or more wireless devices to a hybrid cell access point.

Referring to FIG. 8, an example methodology 800 is shown that facilitates offloading wireless devices to a hybrid cell access point to effectuate load balancing. At 802, a notification of a service level adjustment by a hybrid cell access point can be received. The service level adjustment, in one example, can be modified based at least in part on a load balancing request, and the service level can be adjusted to a more open service level (e.g., from minimum to member-preferred, or from member-preferred to substantially open, as described). At 804, one or more wireless devices can be selected for offloading to the hybrid cell access point. As described, in an example, the one or more wireless devices can be selected based at least in part on a provided CQI (e.g., as compared to other CQIs), a computed trend in CQI (e.g., a degrading CQI), and/or the like. At 806, measurement reports can be requested from the wireless devices to facilitate handing over to the hybrid cell access point. For example, the hybrid cell access point can have lowered DL transmission power to appear more desirable to the one or more wireless devices in generating the measurement reports.

Figure 9:
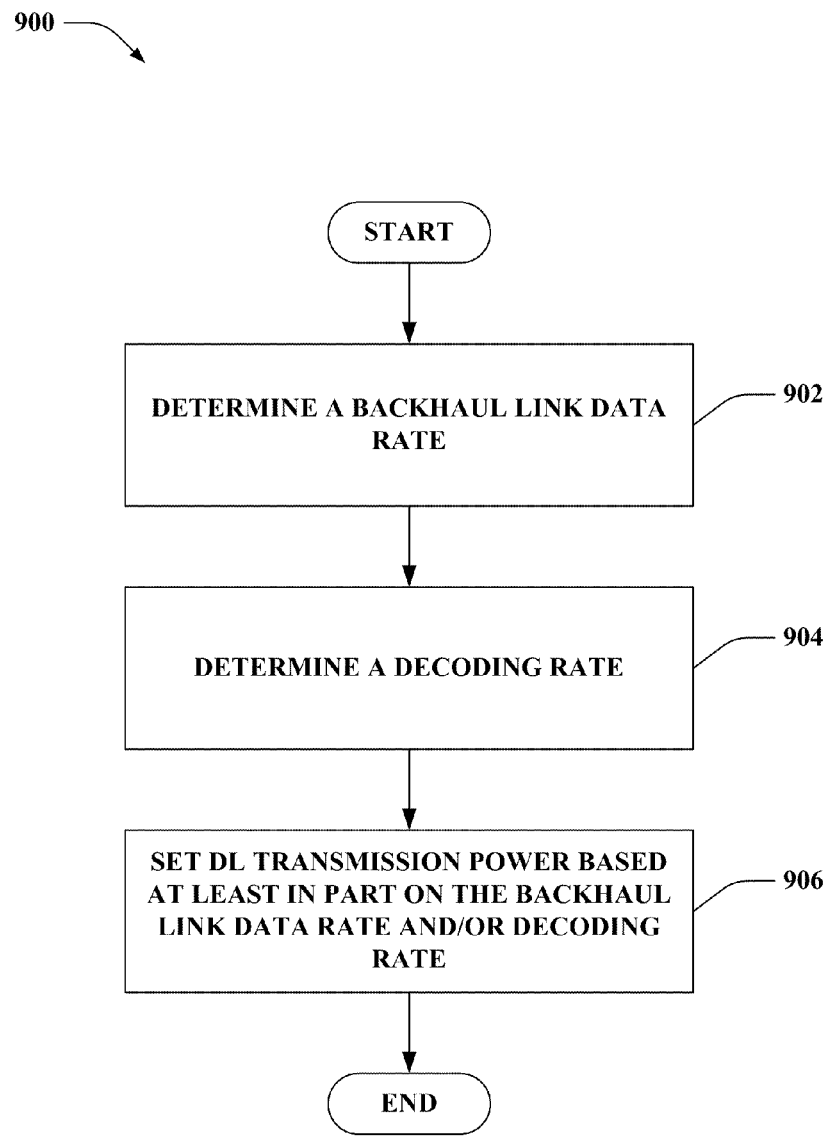
FIG. 9 is an illustration of an example methodology that adjusts a downlink transmission power based at least in part on one or more data rates.

Turning to FIG. 9, an example methodology 900 is shown that modifies downlink transmission power based on one or more data rates to ensure a SNR to a member wireless device.

At 902, a backhaul link data rate can be determined. This can relate to, for example, a rate of communication with a core network. At 904, a decoding rate can be determined as well. For example, this can include computing a rate of processing received packets for providing to a wireless device. At 906, a DL transmission power can be set based at least in part on the backhaul link data rate and/or the decoding rate. In this regard, the DL transmission power can be lowered so as not to interfere with access point communications, but to provide a SNR needed to maximize the backhaul link data rate and/or decoding rate.

Figure 10:
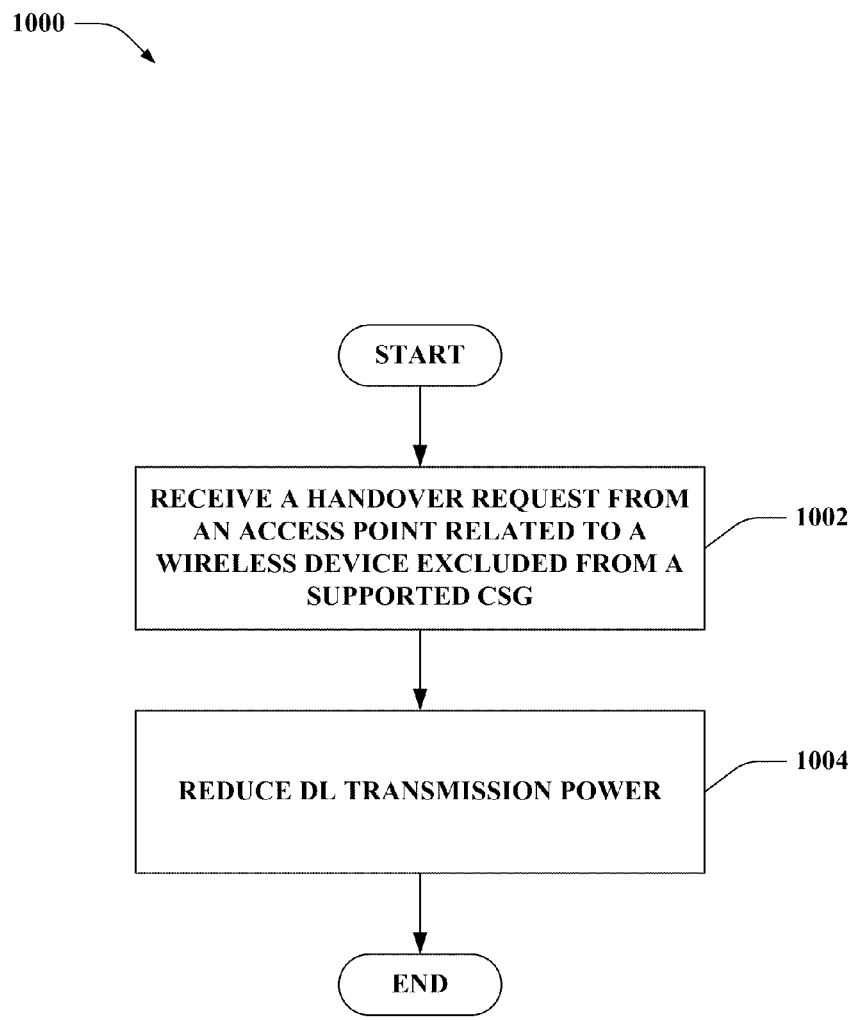
FIG. 10 is an illustration of an example methodology that reduces downlink transmission power to avoid receiving a non-member device.

Referring to FIG. 10, an example methodology 1000 is shown that facilitates avoiding handover request for non-member wireless devices received from an access point. At 1002, a handover request related to a wireless device excluded from a supported CSG can be received from an access point. Upon receiving the request, it can be determined that the wireless device is not in the CSG, for example, by attempting to locate an identifier thereof in an access control list of CSG members. At 1004, DL transmission power can be reduced. This effectively avoids handover for the wireless device from the access point, as described above.

It will be appreciated that, in accordance with one or more aspects described herein, inferences can be made regarding adjusting a service level and/or DL transmission power (e.g., to mitigate interference, to facilitate load balancing, to avoid handover, etc.) and/or the like. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 11:
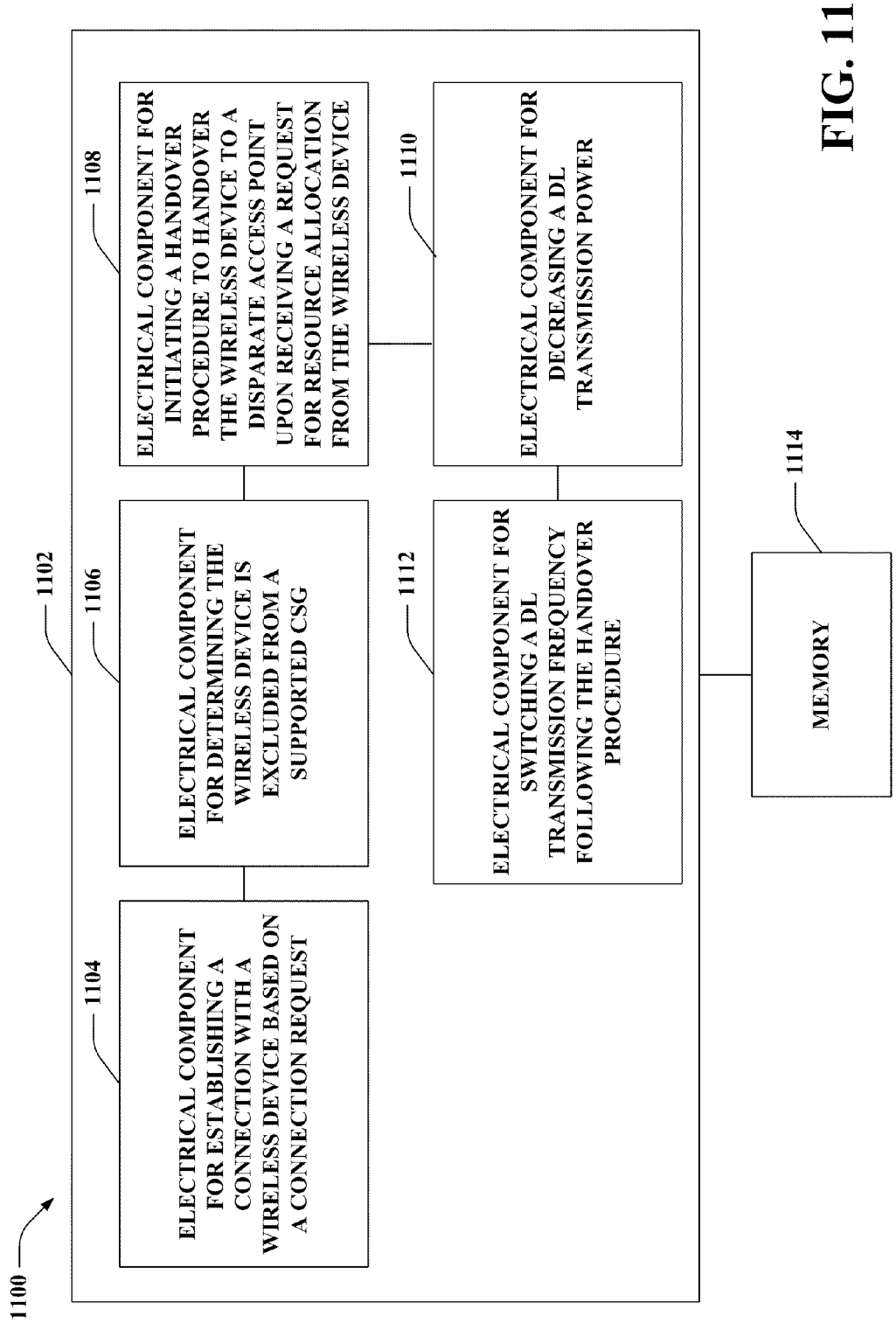
FIG. 11 is an illustration of an example system that facilitates providing at least a minimum level of service to a non-member device.

With reference to FIG. 11, illustrated is a system 1100 for providing a minimum level of service to non-member wireless devices. For example, system 1100 can reside at least partially within a wireless network component. It is to be appreciated that system 1100 is represented as including functional blocks, which can be functional blocks that represent functions implemented by a processor, software, or combination thereof (e.g., firmware). System 1100 includes a logical grouping 1102 of electrical components that can act in conjunction. For instance, logical grouping 1102 can include an electrical component for establishing a connection with a wireless device based on a connection request 1104. As described, the connection establishment procedure can be a random access procedure or similar procedure.

Moreover, logical grouping 1102 can include an electrical component for determining the wireless device is excluded from a supported CSG 1106. For example, electrical component 1106 can determine such based at least in part on an access control list, as described (e.g., determining whether an identifier of the wireless device is in the access control list). Logical grouping 1102 can additionally include an electrical component for initiating a handover procedure to handover the wireless device to a disparate access point upon receiving a request for resource allocation from the wireless device 1108. Thus, for example, at least paging can be provided to the wireless device to allow the wireless device to camp, as described, and once resources are requested, then the wireless device can be handed over to an access point that can provide network access to the wireless device.

In addition, logical grouping 1102 can include an electrical component for decreasing a DL transmission power 1110. This, as described, can mitigate potential interference to communications between the wireless device and the access point to which the wireless device is handed over. In one example, electrical component 1110 can receive SNR or other communication parameters related to the access point and can decrease DL power to improve the SNR of the access point. Moreover, logical grouping 1102 can include an electrical component for switching a DL transmission frequency following the handover procedure 1112. Similarly, this can mitigate interference to communications between the wireless device and access point (e.g., where system 1100 has a significantly better SNR and cannot lower its DL transmission power enough without impacting member wireless devices). Additionally, system 1100 can include a memory 1114 that retains instructions for executing functions associated with electrical components 1104, 1106, 1108, 1110, and 1112. While shown as being external to memory 1114, it is to be understood that one or more of electrical components 1104, 1106, 1108, 1110, and 1112 can exist within memory 1114.

Figure 12:
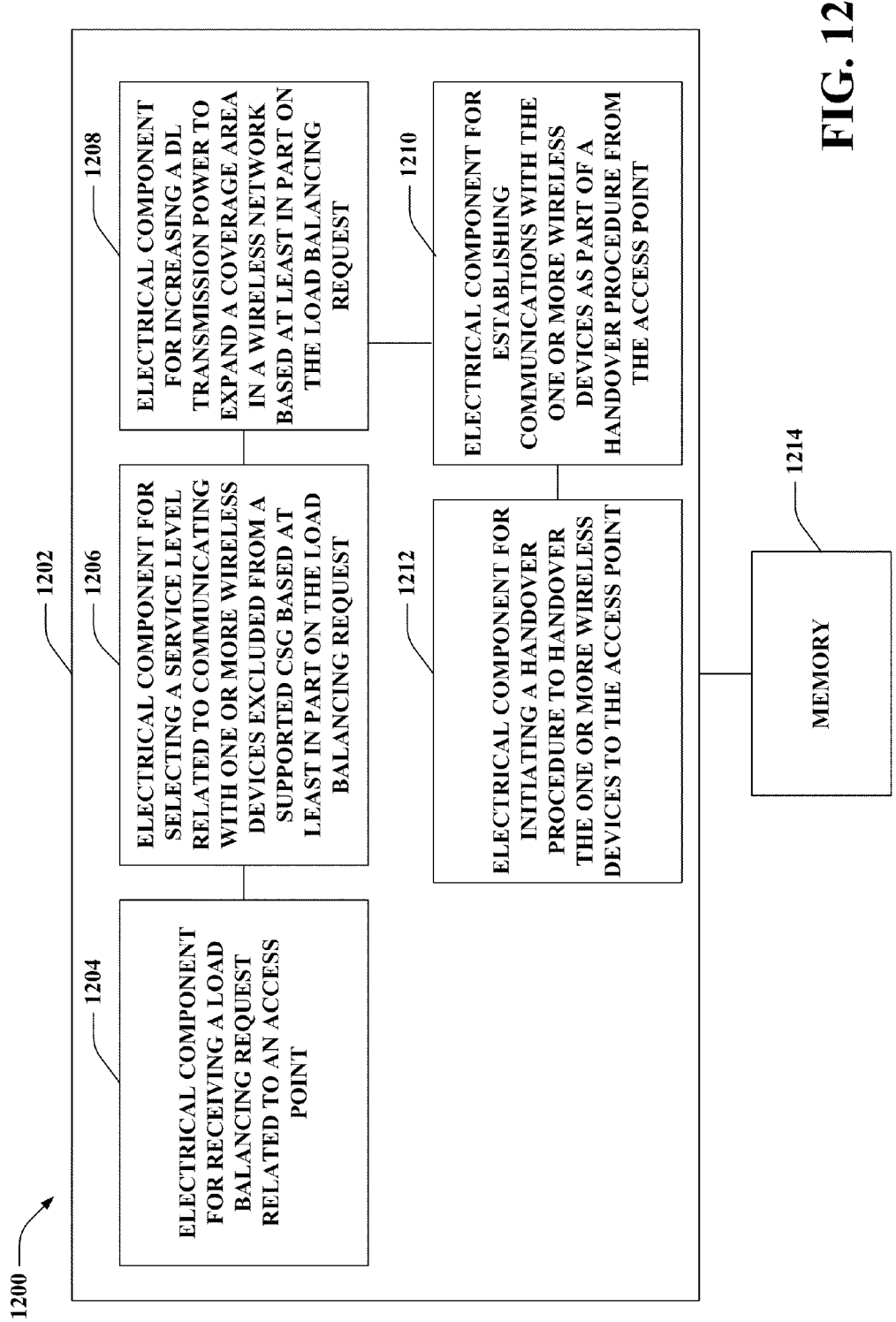
FIG. 12 is an illustration of an example system that adjusts communications parameters to facilitate load balancing with an access point.

With reference to FIG. 12, illustrated is a system 1200 for receiving wireless devices offloaded from an access point to facilitate load balancing. For example, system 1200 can reside at least partially within a wireless network component. It is to be appreciated that system 1200 is represented as including functional blocks, which can be functional blocks that represent functions implemented by a processor, software, or combination thereof (e.g., firmware). System 1200 includes a logical grouping 1202 of electrical components that can act in conjunction. For instance, logical grouping 1202 can include an electrical component for receiving a load balancing request related to an access point 1204. As described, the request can be received from the access point, an OAM, and/or similar network components. Further, logical grouping 1202 can comprise an electrical component for selecting a service level related to communicating with one or more wireless devices excluded from a supported CSG based at least in part on the load balancing request 1206. As described, the service level can be selected to be a more open level than a current service level to facilitate serving an increased number of wireless devices.

Moreover, logical grouping 1202 can include an electrical component for increasing a DL transmission power to expand a coverage area in a wireless network based at least in part on the load balancing request 1208. Thus, system 1200 can support communications from a larger number of wireless devices communicating with the access point by improving SNR in this regard. Logical grouping 1202 can additionally include an electrical component for establishing communications with the one or more wireless devices as part of a handover procedure from the access point 1210. Electrical component 1210 can additionally provide the selected level of service to the one or more wireless devices. In addition, logical grouping 1202 can include an electrical component for initiating a handover procedure to handover the one or more wireless devices to the access point 1212. This can occur, as described, upon receiving a notification of decreased load at the access point such that load balancing is no longer needed, or is needed only at a smaller level. Additionally, system 1200 can include a memory 1214 that retains instructions for executing functions associated with electrical components 1204, 1206, 1208, 1210, and 1212. While shown as being external to memory 1214, it is to be understood that one or more of electrical components 1204, 1206, 1208, 1210, and 1212 can exist within memory 1214.

Figure 13:
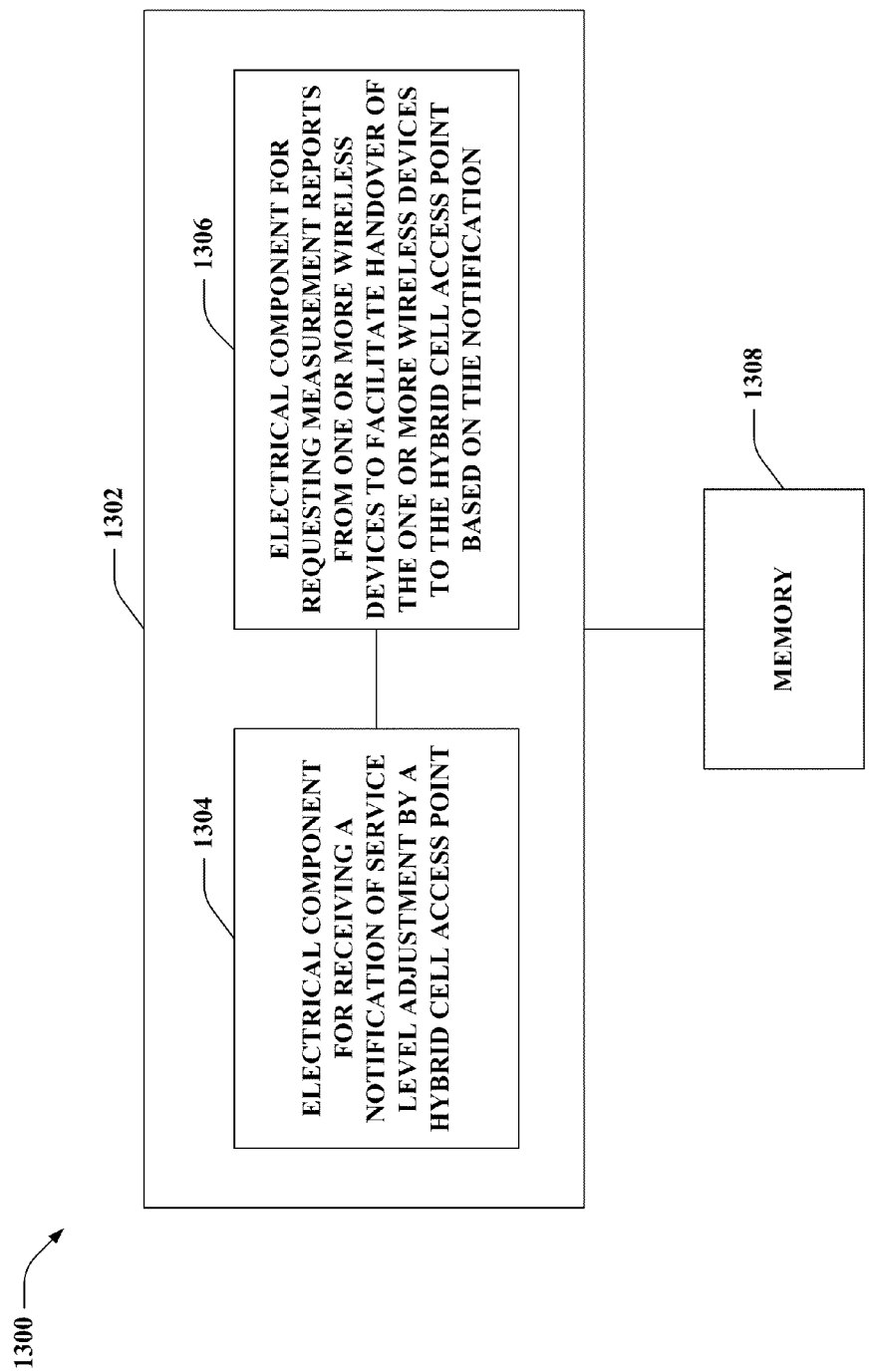
FIG. 13 is an illustration of an example system that offloads one or more devices to a hybrid cell access point.

With reference to FIG. 13, illustrated is a system 1300 for offloading wireless devices to a hybrid cell access point. For example, system 1300 can reside at least partially within a wireless network component. It is to be appreciated that system 1300 is represented as including functional blocks, which can be functional blocks that represent functions implemented by a processor, software, or combination thereof (e.g., firmware). System 1300 includes a logical grouping 1302 of electrical components that can act in conjunction. For instance, logical grouping 1302 can include an electrical component for receiving a notification of service level adjustment by a hybrid cell access point 1304. As described, the service level can be adjusted to a more open service level to promote providing at least some level of service to non-member wireless devices at the hybrid cell access point.

Further, logical grouping 1302 can comprise an electrical component for requesting measurement reports from one or more wireless devices to facilitate handover of the one or more wireless devices to the hybrid cell access point based on the notification 1306. As described, for example, the hybrid cell access point can additionally have increased DL transmission power, and thus can have a more desirable SNR for the one or more wireless devices. Based on the measurement reports, at least a portion of the one or more wireless devices can be handed over to the hybrid cell access point. Additionally, system 1300 can include a memory 1308 that retains instructions for executing functions associated with electrical components 1304 and 1306. While shown as being external to memory 1308, it is to be understood that one or more of electrical components 1304 and 1306 can exist within memory 1308.

Figure 14:
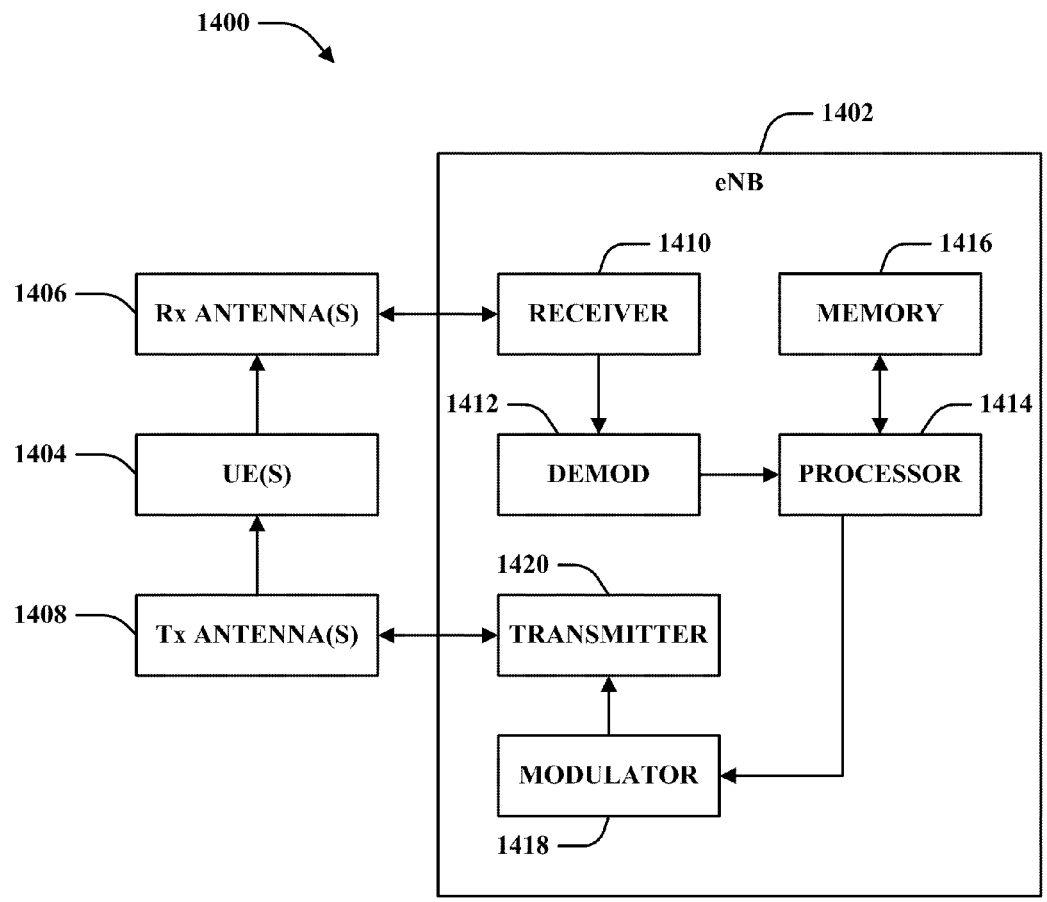
FIGS. 14-15 are block diagrams of example wireless communication devices that can be utilized to implement various aspects of functionalities described herein.

FIG. 14 is a block diagram of a system 1400 that can be utilized to implement various aspects of the functionality described herein. In one example, system 1400 includes a base station or eNB 1402. As illustrated, eNB 1402 can receive signal(s) from one or more UEs 1404 via one or more receive (Rx) antennas 1406 and transmit to the one or more UEs 1404 via one or more transmit (Tx) antennas 1408. Additionally, eNB 1402 can comprise a receiver 1410 that receives information from receive antenna(s) 1406. In one example, the receiver 1410 can be operatively associated with a demodulator (Demod) 1412 that demodulates received information. Demodulated symbols can then be analyzed by a processor 1414. Processor 1414 can be coupled to memory 1416, which can store information related to code clusters, access terminal assignments, lookup tables related thereto, unique scrambling sequences, and/or other suitable types of information. In one example, eNB 1402 can employ processor 1414 to perform methodologies 500, 600, 700, 800, 900, 1000, and/or other similar and appropriate methodologies. eNB 1402 can also include a modulator 1418 that can multiplex a signal for transmission by a transmitter 1420 through transmit antenna(s) 1408.

Figure 15:
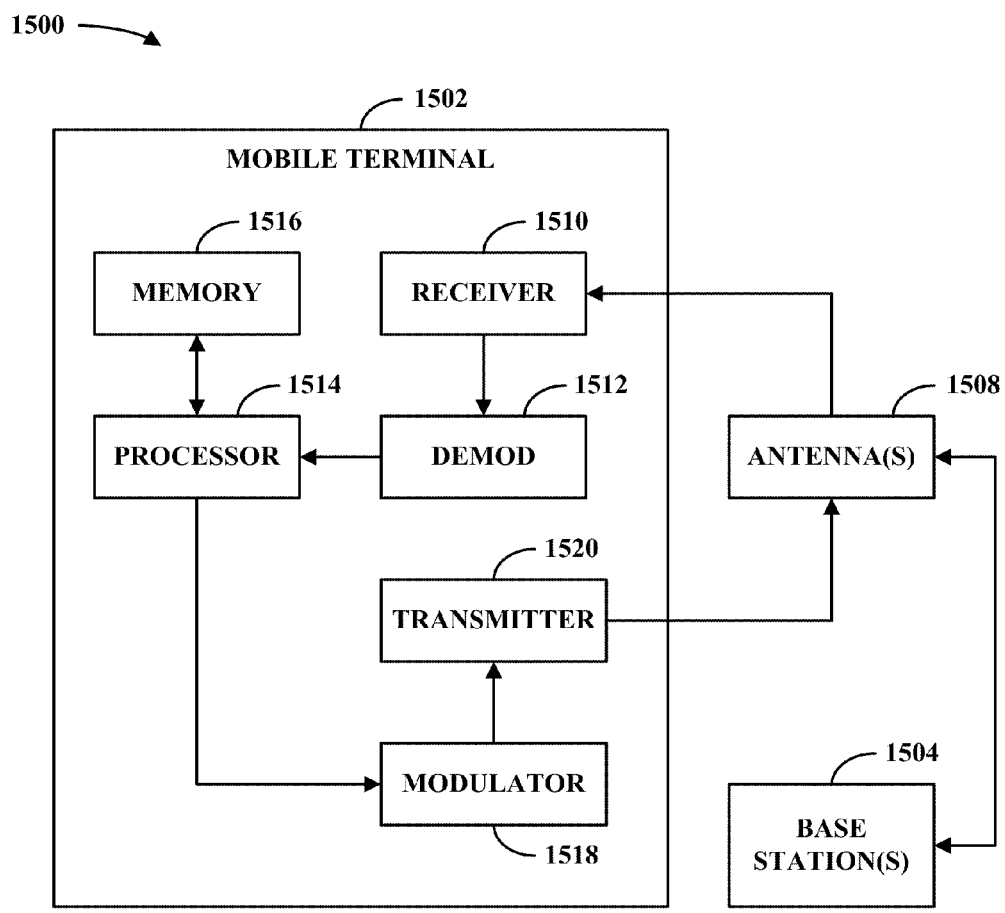

FIG. 15 is a block diagram of another system 1500 that can be utilized to implement various aspects of the functionality described herein. In one example, system 1500 includes a mobile terminal 1502. As illustrated, mobile terminal 1502 can receive signal(s) from one or more base stations 1504 and transmit to the one or more base stations 1504 via one or more antennas 1508. Additionally, mobile terminal 1502 can comprise a receiver 1510 that receives information from antenna(s) 1508. In one example, receiver 1510 can be operatively associated with a demodulator (Demod) 1512 that demodulates received information. Demodulated symbols can then be analyzed by a processor 1514. Processor 1514 can be coupled to memory 1516, which can store data and/or program codes related to mobile terminal 1502. Additionally, mobile terminal 1502 can employ processor 1514 to perform methodologies 500, 600, 700, 800, 900, 1000, and/or other similar and appropriate methodologies. Mobile terminal 1502 can also employ one or more components described in previous figures to effectuate the described functionality; in one example, the components can be implemented by the processor 1514. Mobile terminal 1502 can also include a modulator 1518 that can multiplex a signal for transmission by a transmitter 1520 through antenna(s) 1508.

Figure 16:
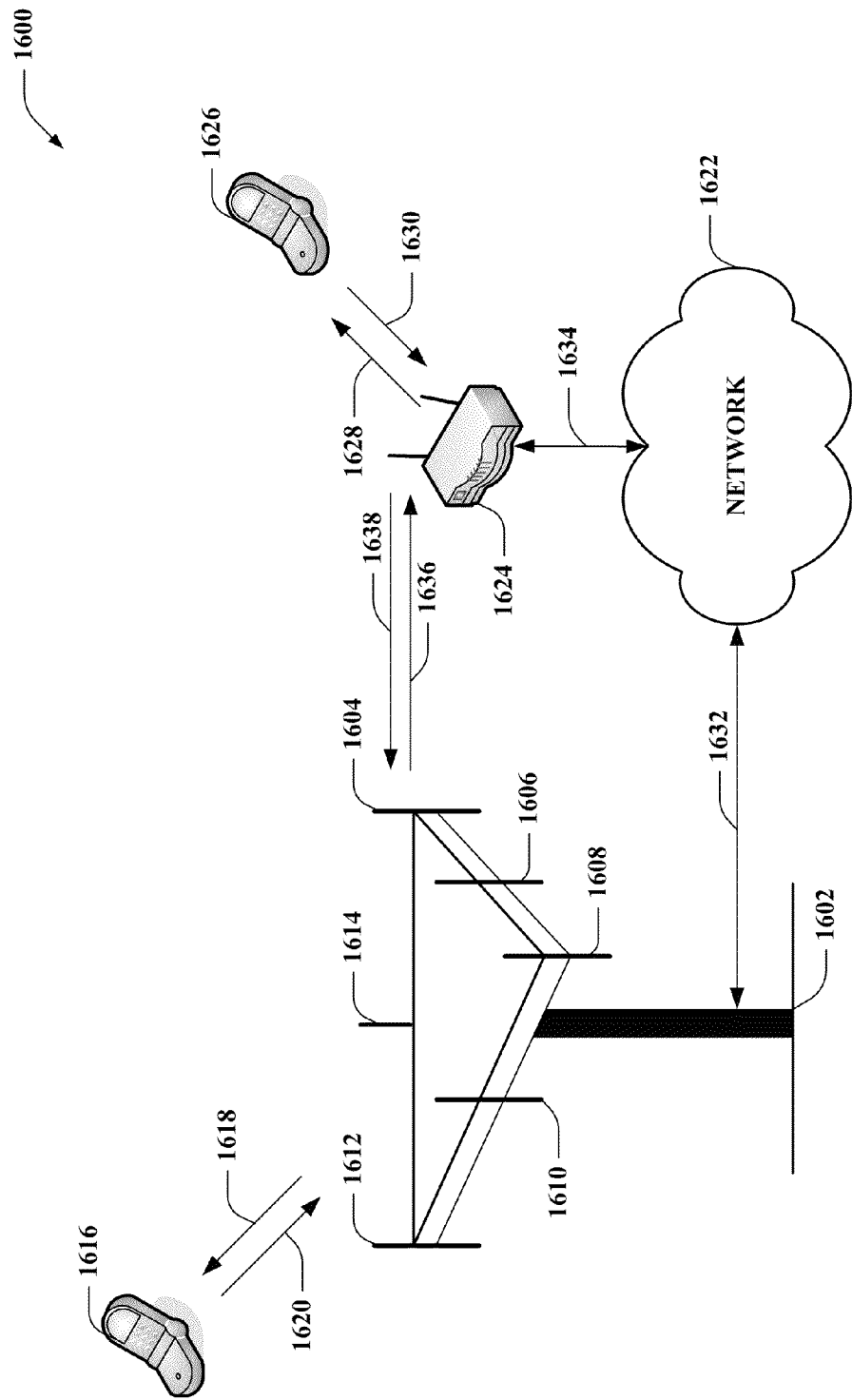
FIG. 16 is an illustration of a wireless communication system in accordance with various aspects set forth herein.

Referring now to FIG. 16, a wireless communication system 1600 is illustrated in accordance with various embodiments presented herein. System 1600 comprises a base station 1602 that can include multiple antenna groups. For example, one antenna group can include antennas 1604 and 1606, another group can comprise antennas 1608 and 1610, and an additional group can include antennas 1612 and 1614. Two antennas are illustrated for each antenna group; however, more or fewer antennas can be utilized for each group. Base station 1602 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 1602 can communicate with one or more mobile devices such as mobile device 1616 and mobile device 1626; however, it is to be appreciated that base station 1602 can communicate with substantially any number of mobile devices similar to mobile devices 1616 and 1626. Mobile devices 1616 and 1626 can be, for example, cellular phones, smart phones, laptops, handheld communication devices, handheld computing devices, satellite radios, global positioning systems, PDAs, and/or any other suitable device for communicating over wireless communication system 1600. As depicted, mobile device 1616 is in communication with antennas 1612 and 1614, where antennas 1612 and 1614 transmit information to mobile device 1616 over a forward link 1618 and receive information from mobile device 1616 over a reverse link 1620. In a frequency division duplex (FDD) system, forward link 1618 can utilize a different frequency band than that used by reverse link 1620, for example. Further, in a time division duplex (TDD) system, forward link 1618 and reverse link 1620 can utilize a common frequency.

Each group of antennas and/or the area in which they are designated to communicate can be referred to as a sector or cell of base station 1602. For example, antenna groups can be designed to communicate to mobile devices in a sector of the areas covered by base station 1602. In communication over forward link 1618, the transmitting antennas of base station 1602 can utilize beamforming to improve signal-to-noise ratio of forward link 1618 for mobile device 1616. Also, while base station 1602 utilizes beamforming to transmit to mobile device 1616 scattered randomly through an associated coverage, mobile devices in neighboring cells can be subject to less interference as compared to a base station transmitting through a single antenna to all its mobile devices. Moreover, mobile devices 1616 and 1626 can communicate directly with one another using a peer-to-peer or ad hoc technology.

In addition, the base station 1602 can communicate with a network 1622, which can be one or more networks including a wireless service access network (e.g., an LTE or similar network), over a backhaul link connection 1632. The network 1622 can store information regarding access parameters related to the mobile device 1616 and 1626 and other parameters of a wireless access network to provide service to the mobile devices 1616 and 1626. Furthermore, a femto cell access point 1624 can be provided to facilitate communicating with the mobile device 1626 over forward link 1628 and reverse link 1630 (similarly to forward link 1618 and reverse link 1620, as described supra). The femto cell access point 1624 can provide access to one or more mobile devices 1626 much like the base station 1602, but on a smaller scale. In one example, femto cell access point 1624 can be configured in a residence, business, and/or other close range setting (e.g., theme park, stadium, apartment complex, etc.). The femto cell access point 1624 can connect to the network 1622 utilizing a backhaul link connection 1634, which can be over or include in part a broadband Internet connection (T1/T3, digital subscriber line (DSL), cable, etc.), in one example. The network 1622 can similarly provide access information for the mobile device 1626.

According to an example, mobile devices 1616 and 1626 can travel over service areas initiating wireless access or performing cell reselection among disparate base stations and/or femto cells during travel or while stationary. In this regard, the mobile devices 1616 and 1626 can effectuate continuous wireless network access seamless to users of the mobile devices 1616 and 1626. In one example (not shown), mobile device 1626 can have been communicating with the base station 1602 similarly to the mobile device 1616, and can have moved into a specified range of the femto cell access point 1624. In this regard, the mobile device 1626 can have reselected one or more cells related to the femto cell access point 1624 to receive more desirable wireless network access. In addition, where mobile device 1626 moves toward base station 1602, it can reselect a cell related thereto, at some point, for a variety of reasons (e.g., to mitigate interference on the femto cell access point 1624, to receive a more optimal signal or increased throughput, etc.).

In traveling over the service area, a given mobile device 1616 and/or 1626 can measure signal quality of available base stations (such as base station 1602), femto cells (such as femto cell access point 1624), and/or other access points, for example, to determine when cell reselection is suitable to the mobile device 1616 and/or 1626. In another example, mobile devices 1616 and/or 1626 can send measurement reports related to disparate cells to their respective access points, base station 1602 and femto cell access point 1624, for determining when to reselect a disparate cell. Such determinations can be made according to one or more parameters in the measurement report. In one example, the measurement reports can rank access points for reselection (e.g., based on signal-to-noise ratio (SNR) or similar parameters). Based on the ranking, for example, base station 1602 can initiate reselection for the mobile devices 1616 and/or 1626 with the highest ranking access point. In an example, however, femto cell access point 1624 can be a closed subscriber group (CSG) access point, to which mobile device 1616 and/or 1626 may or may not be allowed access, and base station 1602 can avoid the femto cell access point 1624 (and/or mobile devices 1616 and/or 1626 can determine not to include femto cell access point 1624 in the neighbor list) in cell reselection.

According to an example, base station 1602 and femto cell access point 1624 can communicate with each other over network 1622 using respective backhaul links 1632 and 1634. For instance, base station 1602 and femto cell access point 1624 can exchange interference management messages to mitigate interference that can be caused in heterogeneous deployments. In another example, base station 1602 and femto cell access point 1624 can coordinate or update neighbor lists by communicating over the network 1622, can communicate context information for mobile devices 1616 and/or 1626 to facilitate cell reselection, can communicate coordinates for mobile device 1616 and/or 1626 triangulation or other location determinations, etc.

In some aspects the teachings herein may be employed in a network that includes macro scale coverage (e.g., a large area cellular network such as a 3G networks, typically referred to as a macro cell network) and smaller scale coverage (e.g., a residence-based or building-based network environment). As an access terminal (AT) moves through such a network, the access terminal may be served in certain locations by access nodes (ANs) that provide macro coverage while the access terminal may be served at other locations by access nodes that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a macro node. A node that provides coverage over a relatively small area (e.g., a residence) may be referred to as a femto node. A node that provides coverage over an area that is smaller than a macro area and larger than a femto area may be referred to as a pico node (e.g., providing coverage within a commercial building).

A cell associated with a macro node, a femto node, or a pico node may be referred to as a macro cell, a femto cell, or a pico cell, respectively. In some implementations, each cell may be further associated with (e.g., divided into) one or more sectors.

In various applications, other terminology may be used to reference a macro node, a femto node, or a pico node. For example, a macro node may be configured or referred to as an access node, base station, access point, eNode B, macro cell, and so on. Also, a femto node may be configured or referred to as a Home Node B, Home eNode B, access point base station, femto cell, and so on.

Figure 17:
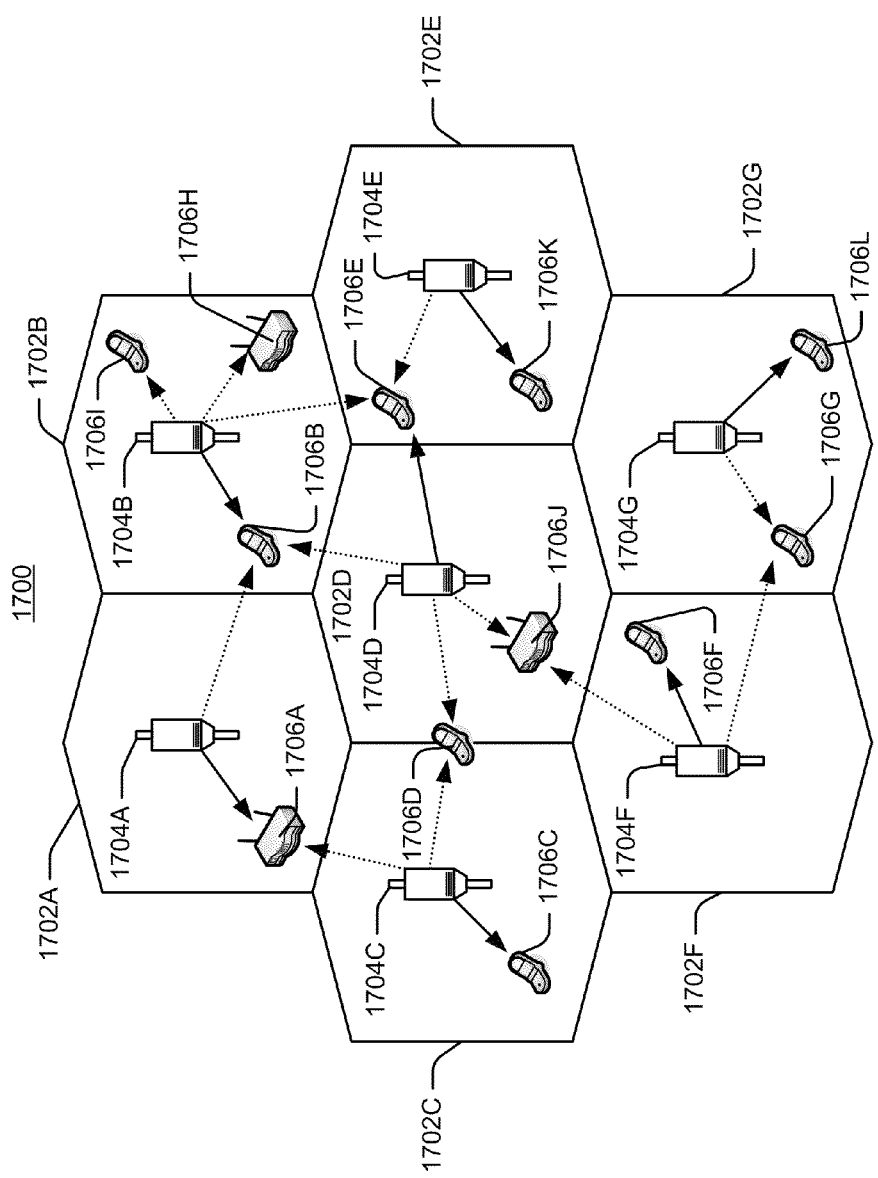
FIG. 17 is an illustration of an example wireless network environment that facilitates providing macro cell and femto cell access point communication.

FIG. 17 illustrates a wireless communication system 1700, configured to support a number of users, in which the teachings herein may be implemented. The system 1700 provides communication for multiple cells 1702, such as, for example, macro cells 1702A-1702G, with each cell being serviced by a corresponding access node 1704 (e.g., access nodes 1704A-1704G). As shown in FIG. 17, access terminals 1706 (e.g., access terminals 1706A-1706L) may be dispersed at various locations throughout the system over time. Each access terminal 1706 may communicate with one or more access nodes 1704 on a forward link (FL) and/or a reverse link (RL) at a given moment, depending upon whether the access terminal 1706 is active and whether it is in soft handoff, for example. The wireless communication system 1700 may provide service over a large geographic region. For example, macro cells 1702A-1702G may cover a few blocks in a neighborhood.

Figure 18:
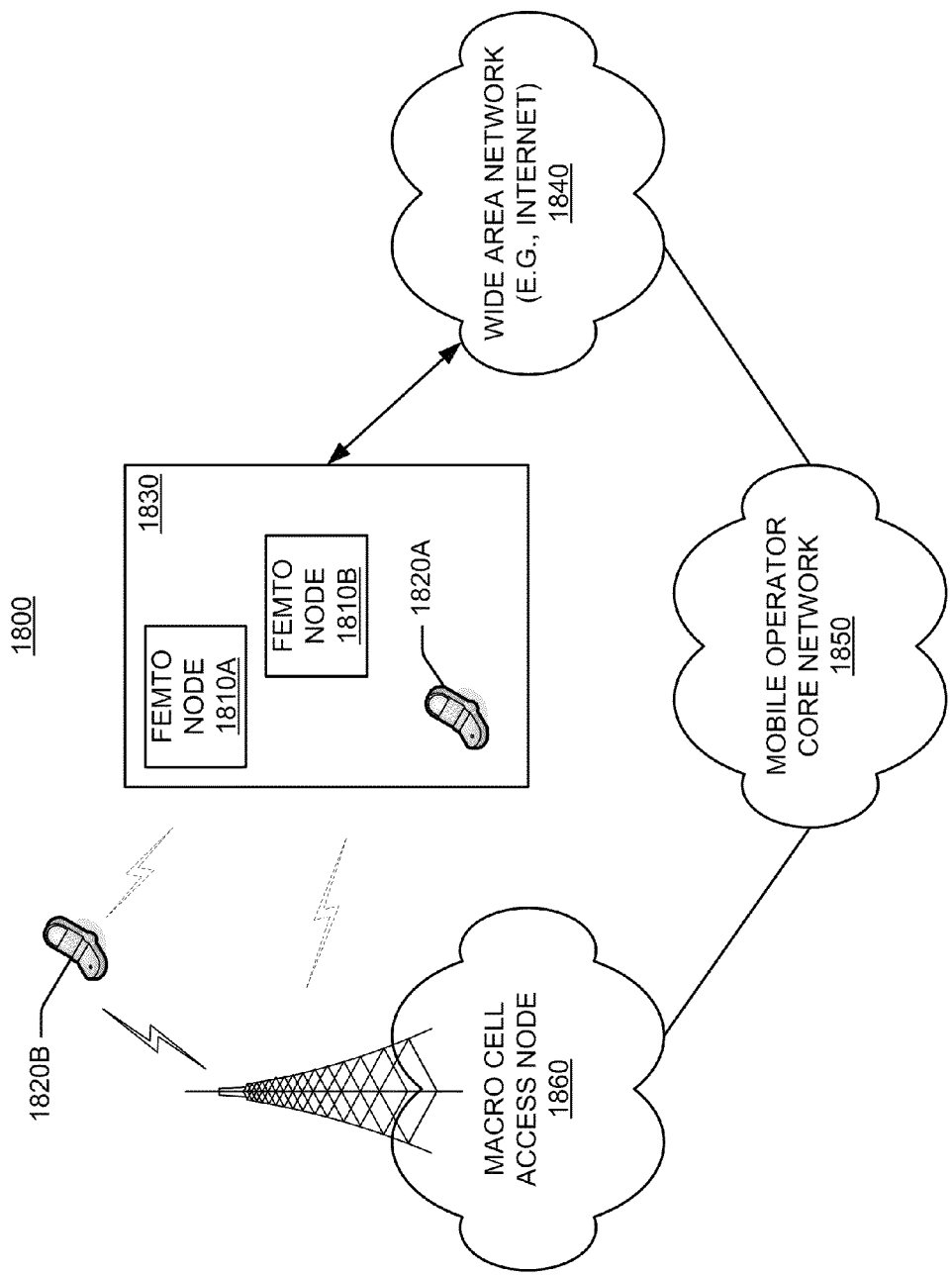
FIG. 18 is an illustration of an example wireless network environment that includes multiple types of access nodes.

FIG. 18 illustrates an exemplary communication system 1800 where one or more femto nodes are deployed within a network environment. Specifically, the system 1800 includes multiple femto nodes 1810 (e.g., femto nodes 1810A and 1810B) installed in a relatively small scale network environment (e.g., in one or more user residences 1830). Each femto node 1810 may be coupled to a wide area network 1840 (e.g., the Internet) and a mobile operator core network 1850 via a DSL router, a cable modem, a wireless link, or other connectivity means (not shown). As will be discussed below, each femto node 1810 may be configured to serve associated access terminals 1820 (e.g., access terminal 1820A) and, optionally, alien access terminals 1820 (e.g., access terminal 1820B). In other words, access to femto nodes 1810 may be restricted whereby a given access terminal 1820 may be served by a set of designated (e.g., home) femto node(s) 1810 but may not be served by any non-designated femto nodes 1810 (e.g., a neighbor's femto node 1810).

Figure 19:
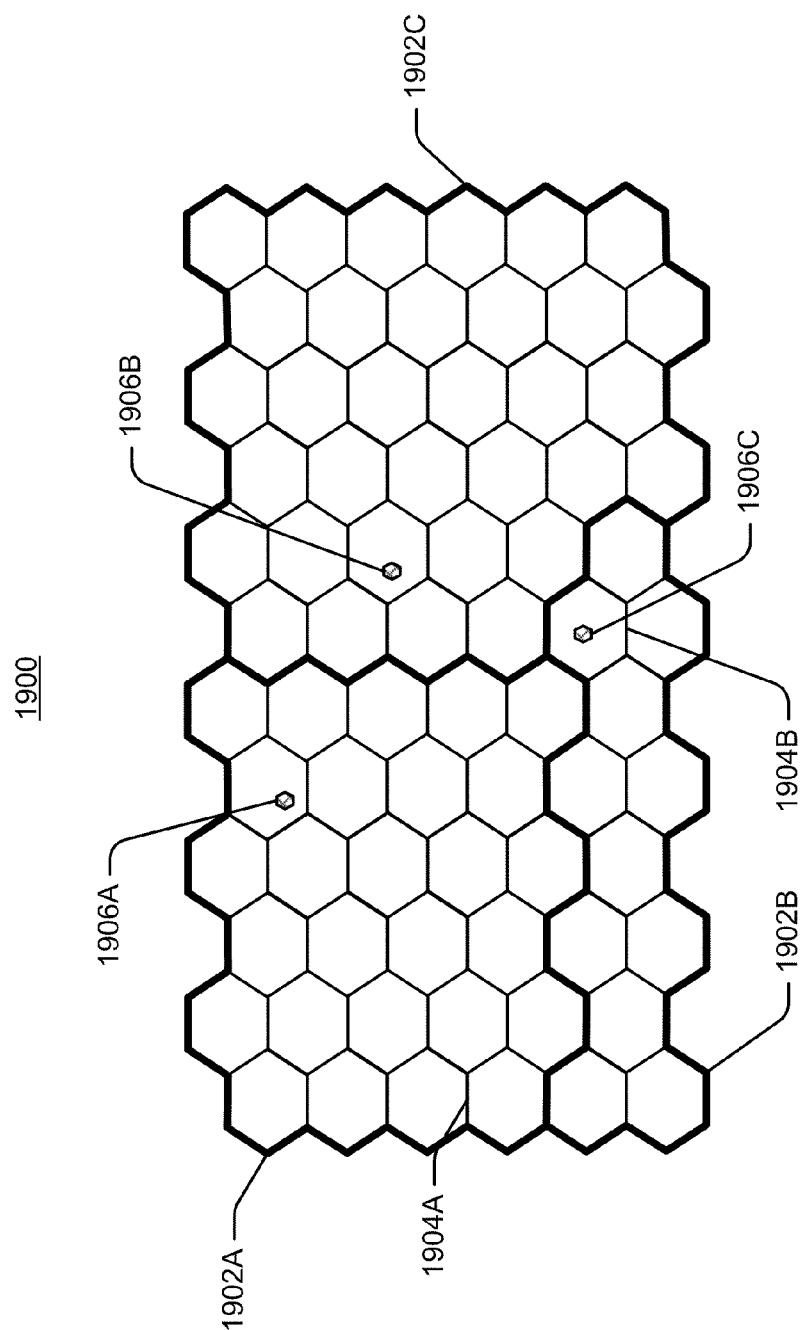
FIG. 19 is an illustration of an example wireless network environment having femto cell access points deployed within macro cells.

FIG. 19 illustrates an example of a coverage map 1900 where several tracking areas 1902 (or routing areas or location areas) are defined, each of which includes several macro coverage areas 1904. Here, areas of coverage associated with tracking areas 1902A, 1902B, and 1902C are delineated by the wide lines and the macro coverage areas 1904 are represented by the hexagons. The tracking areas 1902 also include femto coverage areas 1906. In this example, each of the femto coverage areas 1906 (e.g., femto coverage area 1906C) is depicted within a macro coverage area 1904 (e.g., macro coverage area 1904B). It should be appreciated, however, that a femto coverage area 1906 may not lie entirely within a macro coverage area 1904. In practice, a large number of femto coverage areas 1906 may be defined with a given tracking area 1902 or macro coverage area 1904. Also, one or more pico coverage areas (not shown) may be defined within a given tracking area 1902 or macro coverage area 1904.

Referring again to FIG. 18, the owner of a femto node 1810 may subscribe to mobile service, such as, for example, 3G mobile service, offered through the mobile operator core network 1850. In addition, an access terminal 1820 may be capable of operating both in macro environments and in smaller scale (e.g., residential) network environments. In other words, depending on the current location of the access terminal 1820, the access terminal 1820 may be served by an access node 1860 of the mobile operator core network 1850 or by any one of a set of femto nodes 1810 (e.g., the femto nodes 1810A and 1810B that reside within a corresponding user residence 1830). For example, when a subscriber is outside his home, he is served by a standard macro access node (e.g., node 1860) and when the subscriber is at home, he is served by a femto node (e.g., node 1810A). Here, it should be appreciated that a femto node may be backward compatible with existing access terminals 1820.

A femto node 1810 may be deployed on a single frequency or, in the alternative, on multiple frequencies. Depending on the particular configuration, the single frequency or one or more of the multiple frequencies may overlap with one or more frequencies used by a macro node (e.g., node 1860).

In some aspects, an access terminal 1820 may be configured to connect to a preferred femto node (e.g., the home femto node of the access terminal 1820) whenever such connectivity is possible. For example, whenever the access terminal 1820 is within the user's residence 1830, it may be desired that the access terminal 1820 communicate only with the home femto node 1810.

In some aspects, if the access terminal 1820 operates within the mobile operator core network 1850 but is not residing on its most preferred network (e.g., as defined in a preferred roaming list), the access terminal 1820 may continue to search for the most preferred network (e.g., the preferred femto node 1810) using a Better System Reselection (BSR), which may involve a periodic scanning of available systems to determine whether better systems are currently available, and subsequent efforts to associate with such preferred systems. With the acquisition entry, the access terminal 1820 may limit the search for specific band and channel. For example, the search for the most preferred system may be repeated periodically. Upon discovery of a preferred femto node 1810, the access terminal 1820 selects the femto node 1810 for camping within its coverage area.

A femto node may be restricted in some aspects. For example, a given femto node may only provide certain services to certain access terminals. In deployments with socalled restricted (or closed) association, a given access terminal may only be served by the macro cell mobile network and a defined set of femto nodes (e.g., the femto nodes 1810 that reside within the corresponding user residence 1830). In some implementations, a node may be restricted to not provide, for at least one node, at least one of: signaling, data access, registration, paging, or service.

In some aspects, a restricted femto node (which may also be referred to as a Closed Subscriber Group Home Node B) is one that provides service to a restricted provisioned set of access terminals. This set may be temporarily or permanently extended as necessary. In some aspects, a Closed Subscriber Group (CSG) may be defined as the set of access nodes (e.g., femto nodes) that share a common access control list of access terminals. A channel on which all femto nodes (or all restricted femto nodes) in a region operate may be referred to as a femto channel.

Various relationships may thus exist between a given femto node and a given access terminal. For example, from the perspective of an access terminal, an open femto node may refer to a femto node with no restricted association. A restricted femto node may refer to a femto node that is restricted in some manner (e.g., restricted for association and/or registration). A home femto node may refer to a femto node on which the access terminal is authorized to access and operate on. A guest femto node may refer to a femto node on which an access terminal is temporarily authorized to access or operate on. An alien femto node may refer to a femto node on which the access terminal is not authorized to access or operate on, except for perhaps emergency situations (e.g., 911 calls).

From a restricted femto node perspective, a home access terminal may refer to an access terminal that authorized to access the restricted femto node. A guest access terminal may refer to an access terminal with temporary access to the restricted femto node. An alien access terminal may refer to an access terminal that does not have permission to access the restricted femto node, except for perhaps emergency situations, for example, such as 911 calls (e.g., an access terminal that does not have the credentials or permission to register with the restricted femto node).

For convenience, the disclosure herein describes various functionality in the context of a femto node. It should be appreciated, however, that a pico node may provide the same or similar functionality for a larger coverage area. For example, a pico node may be restricted, a home pico node may be defined for a given access terminal, and so on.

A wireless multiple-access communication system may simultaneously support communication for multiple wireless access terminals. As mentioned above, each terminal may communicate with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 20:
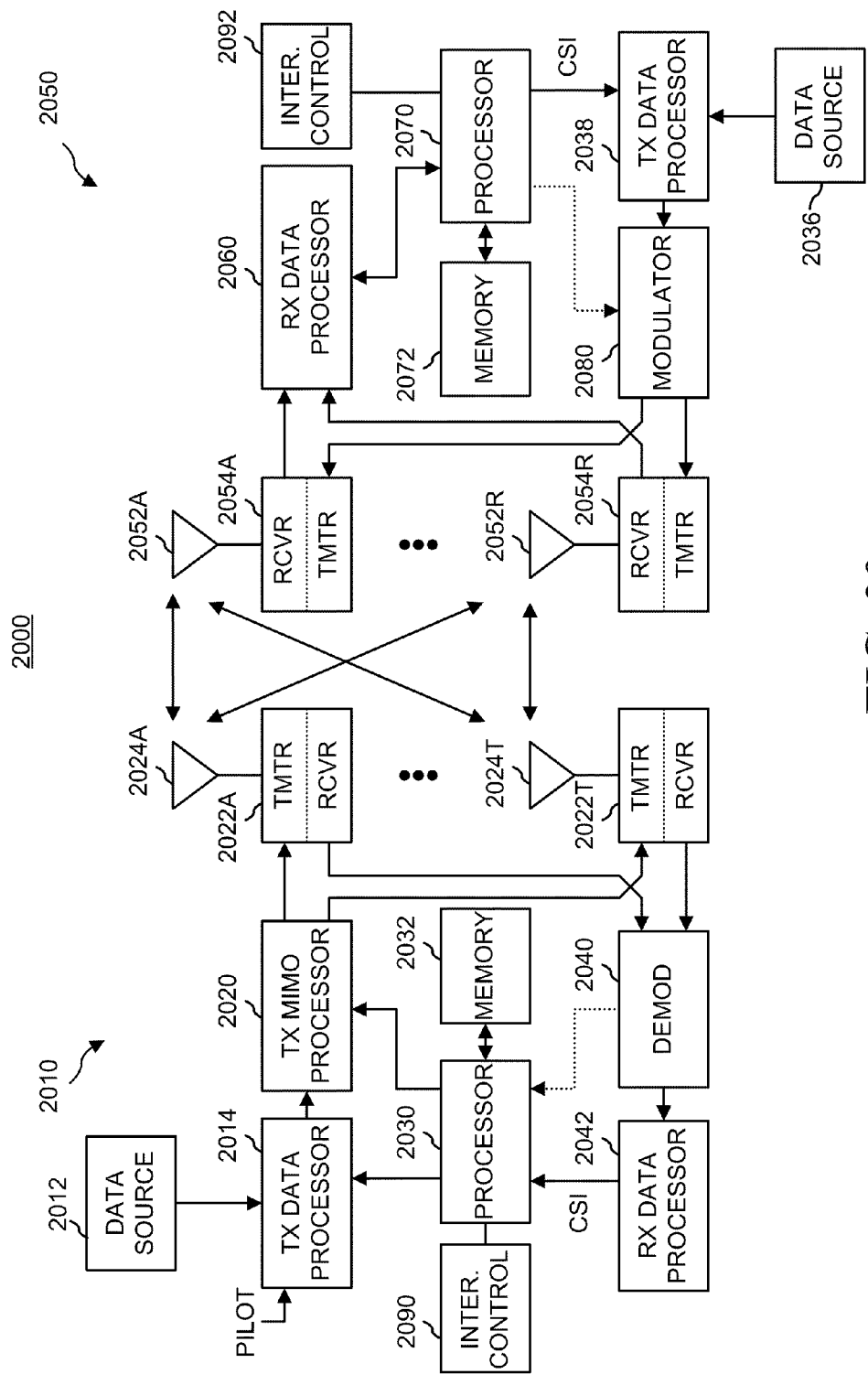
FIG. 20 is an illustration of an example wireless network environment that can be employed in conjunction with the various systems and methods described herein.

The teachings herein may be incorporated into a node (e.g., a device) employing various components for communicating with at least one other node. FIG. 20 depicts several sample components that may be employed to facilitate communication between nodes. Specifically, FIG. 20 illustrates a wireless device 2010 (e.g., an access point) and a wireless device 2050 (e.g., an access terminal) of a MIMO system 2000. At the device 2010, traffic data for a number of data streams is provided from a data source 2012 to a transmit (TX) data processor 2014.

In some aspects, each data stream is transmitted over a respective transmit antenna. The TX data processor 2014 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 2030. A data memory 2032 may store program code, data, and other information used by the processor 2030 or other components of the device 2010.

The modulation symbols for all data streams are then provided to a TX MIMO processor 2020, which may further process the modulation symbols (e.g., for OFDM). The TX MIMO processor 2020 then provides $N_T$ modulation symbol streams to $N_T$ transceivers (XCVR) 2022A through 2022T. In some aspects, the TX MIMO processor 2020 applies beam-forming weights to the symbols of the data streams and to the antenna from which the symbol is being transmitted.

Each transceiver 2022 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 2022A through 2022T are then transmitted from $N_T$ antennas 2024A through 2024T, respectively.

At the device 2050, the transmitted modulated signals are received by $N_R$ antennas 2052A through 2052R and the received signal from each antenna 2052 is provided to a respective transceiver (XCVR) 2054A through 2054R. Each transceiver 2054 conditions (e.g., filters, amplifies, and downconverts) a respective received signal, digitizes the conditioned signal to provide samples, and further processes the samples to provide a corresponding "received" symbol stream.

A receive (RX) data processor 2060 then receives and processes the $N_R$ received symbol streams from $N_R$ transceivers 2054 based on a particular receiver processing technique to provide $N_T$ "detected" symbol streams. The RX data processor 2060 then demodulates, deinterleaves, and decodes each detected symbol stream to recover the traffic data for the data stream. The processing by the RX data processor 2060 is complementary to that performed by the TX MIMO processor 2020 and the TX data processor 2014 at the device 2010.

A processor 2070 periodically determines which pre-coding matrix to use (discussed below). The processor 2070 formulates a reverse link message comprising a matrix index portion and a rank value portion. A data memory 2072 may store program code, data, and other information used by the processor 2070 or other components of the device 2050.

The reverse link message may comprise various types of information regarding the communication link and/or the received data stream. The reverse link message is then processed by a TX data processor 2038, which also receives traffic data for a number of data streams from a data source 2036, modulated by a modulator 2020, conditioned by the transceivers 2054A through 2054R, and transmitted back to the device 2010.

At the device 2010, the modulated signals from the device 2050 are received by the antennas 2024, conditioned by the transceivers 2022, demodulated by a demodulator (DEMOD) 2040, and processed by a RX data processor 2042 to extract the reverse link message transmitted by the device 2050. The processor 2030 then determines which pre-coding matrix to use for determining the beam-forming weights then processes the extracted message.

FIG. 20 also illustrates that the communication components may include one or more components that perform interference control operations as taught herein. For example, an interference (INTER) control component 2090 may cooperate with the processor 2030 and/or other components of the device 2010 to send/receive signals to/from another device (e.g., device 2050) as taught herein. Similarly, an interference control component 2092 may cooperate with the processor 2070 and/or other components of the device 2050 to send/receive signals to/from another device (e.g., device 2010). It should be appreciated that for each device 2010 and 2050 the functionality of two or more of the described components may be provided by a single component. For example, a single processing component may provide the functionality of the interference control component 2090 and the processor 2030 and a single processing component may provide the functionality of the interference control component 2092 and the processor 2070.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Furthermore, to the extent that the term "includes" is used in either the detailed description or the claims, such term is intended to be inclusive in a manner similar to the term "comprising" as "comprising" is interpreted when employed as a transitional word in a claim. Furthermore, although elements of the described aspects and/or aspects may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A wireless communications method, comprising:
establishing a connection with a wireless device based on a received connection request;
determining the wireless device is excluded from a supported closed subscriber group;
determining a level of service to provide to the wireless device based on load information received from a disparate access point, the level of service assigning a smaller portion of resources to the wireless device as compared to that provided to wireless devices that are not excluded from the supported closed subscriber group for non-emergency calls, the load information indicating a desired number of devices to handover; and
initiating a handover procedure to handover the wireless device to the disparate access point based on the load information received from the disparate access point, the handover procedure requesting one or more measurement reports from the wireless device corresponding to one or more neighboring access points including the disparate access point.

2. The method of claim 1, further comprising decreasing a downlink transmission power to mitigate interference with communications between the wireless device and the disparate access point.

3. The method of claim 2, wherein the decreasing the downlink transmission power is based at least in part on maintaining a signal-to-noise ratio with one or more disparate wireless devices included in the supported closed subscriber group corresponding to a backhaul link data rate or a decoding rate.

4. The method of claim 1, further comprising switching a downlink transmission frequency following the handover procedure to mitigate interference with communications between the wireless device and the disparate access point.

5. The method of claim 1, wherein requesting one or more measurement reports includes requesting intra-frequency and inter-frequency measurement reports.

6. The method of claim 1, wherein the determining the wireless device is excluded from the supported closed subscriber group includes verifying an identifier related to the wireless device is excluded from an access control list of closed subscriber group members, or receiving an indication from a wireless network that the wireless device is excluded from the supported closed subscriber group.

7. The method of claim 1, further comprising communicating with one or more disparate wireless devices included in the closed subscriber group.

8. The method of claim 7, further comprising:
receiving a request to obtain a disparate wireless device excluded from the closed subscriber group in a disparate handover procedure from an access point; and
lowering a downlink transmission power based at least in part on receiving the request.

9. The method of claim 8, wherein the lowering the downlink transmission power includes lowering the downlink transmission power based at least in part on a reference signal received power or quality related to the disparate access point.

10. The method of claim 1, further comprising transmitting one or more paging signals to the wireless device to provide at least a minimum level of service to the wireless device.

11. The method of claim 1, further comprising receiving a request for resource allocation from the wireless device including a request for a data bearer from the wireless device.

12. The method of claim 1, further comprising receiving a request for resource allocation from the wireless device including a request to establish a public data network connection from the wireless device.

13. The method of claim 1, further comprising receiving a request for resource allocation from the wireless device including an indication to activate radio bearers as part of a registration procedure.

14. The method of claim 1, wherein initiating the handover procedure further comprises receiving a request for handover to the disparate access point from the wireless device in response to a determination that the smaller portion of resources provided to the wireless device is insufficient for the wireless device.

15. The method of claim 1, wherein the load information indicates at least one of a service level for the wireless device excluded from the supported closed subscriber group, a maximum downlink transmission power, and resources blanked by the disparate access point.

16. A wireless communications apparatus, comprising:
at least one processor configured to:
perform a random access procedure to establish a connection with a wireless device;
identify the wireless device as excluded from a supported closed subscriber group;
determine a level of service to provide to the wireless device based on load information received from a disparate access point, the level of service assigning a smaller portion of resources to the wireless device as compared to that provided to wireless devices that are not excluded from the supported closed subscriber group for non-emergency calls, the load information indicating a desired number of devices to handover; and
initiate a handover procedure to handover the wireless device to the disparate access point based on the load information received from the disparate access point, the handover procedure requesting one or more measurement reports from the wireless device corresponding to one or more neighboring access points including the disparate access point; and
a memory coupled to the at least one processor.

17. The wireless communications apparatus of claim 16, wherein the at least one processor is further configured to decrease a downlink transmission power to mitigate interference with communications between the wireless device and the disparate access point.

18. The wireless communications apparatus of claim 16, wherein the at least one processor is further configured to select a disparate downlink transmission frequency following the handover procedure to mitigate interference with communications between the wireless device and the disparate access point.

19. The wireless communications apparatus of claim 16, wherein the at least one processor is further configured to lower a downlink transmit power upon obtaining a request to receive a disparate wireless device excluded from the closed subscriber group in a disparate handover procedure from an access point.

20. The wireless communications apparatus of claim 16, wherein the at least one processor is further configured to provide at least a minimum level of service to the wireless device by communicating one or more paging signals to the wireless device.

21. The wireless communications apparatus of claim 16, wherein the request for network access includes a request for a data bearer, a request to establish a public data network connection, or an indication to activate radio bearers as part of a registration procedure.

22. The wireless communications apparatus of claim 16, wherein the processor is further configured to initiate the handover procedure based on a request for handover to the disparate access point from the wireless device received in response to a determination that the smaller portion of resources provided to the wireless device is insufficient for the wireless device.

23. The wireless communications apparatus of claim 16, wherein the load information indicates at least one of a service level for the wireless device excluded from the supported closed subscriber group, a maximum downlink transmission power, and resources blanked by the disparate access point.

24. A wireless communications apparatus, comprising:
  means for establishing a connection with a wireless device based on a connection request;
  means for determining the wireless device is excluded from a supported closed subscriber group;
  means for determining a level of service to provide to the wireless device based on load information received from a disparate access point, the level of service assigning a smaller portion of resources to the wireless device as compared to that provided to wireless devices that are not excluded from the supported closed subscriber group for non-emergency calls, the load information indicating a desired number of devices to handover; and
  means for initiating a handover procedure to handover the wireless device to the disparate access point based on the load information received from the disparate access point, the handover procedure requesting one or more measurement reports from the wireless device corresponding to one or more neighboring access points including the disparate access point.

25. The apparatus of claim 24, further comprising means for decreasing a downlink transmission power to mitigate interference caused to communications between the wireless device and the disparate access point.

26. The apparatus of claim 24, further comprising means for switching a downlink transmission frequency following the handover procedure to mitigate interference caused to communications between the wireless device and the disparate access point.

27. The apparatus of claim 24, further comprising means for receiving a request for handover to the disparate access point from the wireless device, the request received in response to a determination that the smaller portion of resources provided to the wireless device is insufficient for the wireless device.

28. The apparatus of claim 24, wherein the load information indicates at least one of a service level for the wireless device excluded from the supported closed subscriber group, a maximum downlink transmission power, and resources blanked by the disparate access point.

29. A wireless communications computer program product, comprising:
  a non-transitory computer-readable medium comprising:
    code for causing at least one computer to perform a random access procedure to establish a connection with a wireless device;
    code for causing the at least one computer to identify the wireless device as excluded from a supported closed subscriber group;
    code for causing the at least one computer to determine a level of service to provide to the wireless device based on load information received from a disparate access point, the level of service comprising assigning a smaller portion of resources to the wireless device as compared to that provided to wireless devices that are not excluded from the supported closed subscriber group for non-emergency calls, the load information indicating a desired number of devices to handover; and
    code for causing the at least one computer to initiate a handover procedure to handover the wireless device to the disparate access point based on the load information received from the disparate access point, the handover procedure requesting one or more measurement reports from the wireless device corresponding to one or more neighboring access points including the disparate access point.

30. The computer program product of claim 29, wherein the non-transitory computer-readable medium further comprises code for causing the at least one computer to decrease a downlink transmission power to mitigate interference with communications between the wireless device and the disparate access point.

31. The computer program product of claim 29, wherein the non-transitory computer-readable medium further comprises code for causing the at least one computer to select a disparate downlink transmission frequency following the handover procedure to mitigate interference with communications between the wireless device and the disparate access point.

32. The computer program product of claim 29, wherein the non-transitory computer-readable medium further comprises code for causing the at least one computer to lower a downlink transmit power upon obtaining a request to receive a disparate wireless device excluded from the closed subscriber group in a disparate handover procedure from an access point.

33. The computer program product of claim 29, wherein the non-transitory computer-readable medium further comprises code for causing the at least one computer to provide at least a minimum level of service to the wireless device by communicating one or more paging signals to the wireless device.

34. The computer program product of claim 29, further comprising code for causing the at least one computer to receive a request for handover to the disparate access point from the wireless device in response to a determination that the smaller portion of resources provided to the wireless device is insufficient for the wireless device.

35. The computer program product of claim 29, wherein the load information indicates at least one of a service level for the wireless device excluded from the supported closed subscriber group, a maximum downlink transmission power, and resources blanked by the disparate access point.

36. A wireless communications apparatus, comprising:
  a connection establishing component that establishes a connection with a wireless device based on a connection request;
  a closed subscriber group member determining component that discerns the wireless device is excluded from a supported closed subscriber group;
  a service level determining component that determines a level of service to provide to the wireless device based on load information received from a disparate access point, the level of service comprising assigning a smaller portion of resources to the wireless device as compared to that provided to wireless devices that are not excluded from the supported closed subscriber group for non-emergency calls based on load information received from a disparate access point, the load information indicating a desired number of devices to handover; and a handover component that initiates a handover procedure to handover the wireless device to the disparate access point based on the load information received from the disparate access point, the handover procedure requesting one or more measurement reports from the wireless device corresponding to one or more neighboring access points including the disparate access point.

37. The apparatus of claim 36, further comprising a transmitting component that decreases a downlink transmission power to mitigate interference to communications between the wireless device and the disparate access point.

38. The apparatus of claim 36, further comprising a transmitting component that adjusts a downlink transmission frequency following the handover procedure to mitigate interference to communications between the wireless device and the disparate access point.

39. The apparatus of claim 36, further comprising a paging component that transmits one or more paging signals to the wireless device to provide at least a minimum level of service to the wireless device.

40. The apparatus of claim 36, further comprising request receiving component that receives a request for handover to the disparate access point from the wireless device in response to a determination that the smaller portion of resources provided to the wireless device is insufficient for the wireless device.

41. The apparatus of claim 36, wherein the load information indicates at least one of a service level for the wireless device excluded from the supported closed subscriber group, a maximum downlink transmission power, and resources blanked by the disparate access point.

* * * * *